US012463688B2

(12) United States Patent
Cao

(10) Patent No.: US 12,463,688 B2
(45) Date of Patent: Nov. 4, 2025

(54) ELECTRONIC DEVICE, COMMUNICATION METHOD AND COMPUTER PROGRAM PRODUCT

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/694,429

(22) PCT Filed: Oct. 8, 2022

(86) PCT No.: PCT/CN2022/123762
§ 371 (c)(1),
(2) Date: Mar. 22, 2024

(87) PCT Pub. No.: WO2023/056922
PCT Pub. Date: Apr. 13, 2023

(65) Prior Publication Data
US 2024/0388338 A1 Nov. 21, 2024

(30) Foreign Application Priority Data
Oct. 9, 2021 (CN) .......................... 202111174535.7

(51) Int. Cl.
H04B 7/06 (2006.01)
H04B 7/024 (2017.01)

(52) U.S. Cl.
CPC ............... H04B 7/06 (2013.01); H04B 7/024 (2013.01)

(58) Field of Classification Search
CPC ........ H04B 7/022; H04B 7/024; H04B 7/026; H04B 7/0404; H04B 7/06
(Continued)

(56) References Cited

U.S. PATENT DOCUMENTS

2020/0154450 A1    5/2020   Zhou et al.
2021/0058971 A1*   2/2021   MolavianJazi ....... H04W 72/23
(Continued)

FOREIGN PATENT DOCUMENTS

CN    107888266 A    4/2018
CN    110049561 A    7/2019
(Continued)

OTHER PUBLICATIONS

International Search Report and Written Opinion mailed on Nov. 30, 2022, received for PCT Application PCT/CN2022/123762, filed on Oct. 8, 2022, 08 pages including English Translation.

Primary Examiner — Young T. Tse
(74) Attorney, Agent, or Firm — XSENSUS LLP

(57) ABSTRACT

The present disclosure relates to an electronic device, a communication method and a computer program product in a wireless communication system. There is provided an electronic device on side of a user equipment (UE), comprising a processing circuitry configured to receive a quasi co-location (QCL) indication regarding a QCL assumption between a first antenna port and a second antenna port, the QCL indication referencing a plurality of QCL parameters; according to a dropping rule associated with the QCL indication, drop a portion of the plurality of QCL parameters; and establish a QCL relation between the first antenna port and the second antenna port with respect to remaining QCL parameters referenced in the QCL indication.

18 Claims, 13 Drawing Sheets

(58) Field of Classification Search
USPC ........ 375/260, 267; 370/330, 334, 336, 343, 370/345; 455/456.5, 456.6
See application file for complete search history.

(56) References Cited

U.S. PATENT DOCUMENTS

| | | | |
|---|---|---|---|
| 2021/0226682 A1* | 7/2021 | Park | H04L 5/005 |
| 2022/0116981 A1* | 4/2022 | Saber | H04L 1/08 |
| 2022/0232613 A1* | 7/2022 | Gao | H04L 1/1887 |
| 2023/0062459 A1* | 3/2023 | Abdelghaffar | H04B 7/0408 |

FOREIGN PATENT DOCUMENTS

| | | |
|---|---|---|
| CN | 110536436 A | 12/2019 |
| CN | 111435883 A | 7/2020 |
| CN | 113039741 A | 6/2021 |
| CN | 113196699 A | 7/2021 |

* cited by examiner

ELECTRONIC DEVICE, COMMUNICATION METHOD AND COMPUTER PROGRAM PRODUCT

CROSS-REFERENCE TO RELATED APPLICATIONS

The present application is based on PCT filing PCT/CN2022/123762, filed Oct. 8, 2022, which claims priority to Chinese Patent Application No. 202111174535.7, filed Oct. 9, 2021, each of which is incorporated herein by reference in its entirety.

FIELD OF THE INVENTION

The present disclosure relates to the field of wireless communication, and more particularly, to an electronic device, a communication method, and a computer program product for providing improvements of Quasi-Colocation (QCL) indication mechanism to enhance its applicability.

BACKGROUND

In Release 15/16 of the 5G NR standard protocol, a mechanism for defining and indicating a QCL relation between two reference signals is provided, so that a user equipment (UE) can infer, from a reference signal, time-domain, frequency-domain, and/or spatial-domain parameters for another reference signal, so that the parameters for previously receiving the another reference signal can be used to implement reception of the upcoming reference signal, which is also an essence of QCL.

Typically, the 5G NR can use a transmission configuration indicator (TCI) state to indicate the QCL relation between two downlink reference signals. Depending on parameters indicated in the TCI state, QCL assumptions of four types, QCL-TypeA, QCL-TypeB, QCL-TypeC, QCL-TypeD, can be included. For any of the types, the UE applies the involved QCL parameters in an all-or-none manner.

However, the limited four types do not cover all combinations of possible QCL parameters that may be used, and because of the limited number of configurable and activatable TCI states, not all types of TCI states for each reference signal are directly available. In some application scenarios, applicability of the current QCL indication mechanism may face challenges.

Therefore, there is a need to indicate QCL parameters more flexibly in order to improve the applicability in various application scenarios.

SUMMARY OF THE INVENTION

The present disclosure provides a number of aspects. The above-described need may be met by applying one or more aspects of the present disclosure.

A brief summary regarding the present disclosure is given here to provide a basic understanding on some aspects of the present disclosure. However, it will be appreciated that the summary is not an exhaustive description of the present disclosure. It is not intended to identify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device on user equipment (UE) side, comprising a processing circuitry configured to receive, from a base station, a quasi co-location (QCL) indication regarding a QCL assumption between a first antenna port and a second antenna port, the QCL indication referencing a plurality of QCL parameters; according to a dropping rule associated with the QCL indication, drop a portion of the plurality of QCL parameters; and establish a QCL relation between the first antenna port and the second antenna port with respect to remaining QCL parameters referenced in the QCL indication.

According to one aspect of the present disclosure, there is provided an electronic device on base station side, comprising a processing circuitry configured to generate a quasi co-location (QCL) indication regarding a QCL assumption between a first antenna port and a second antenna port, the QCL indication referencing a plurality of QCL parameters; determine a dropping rule associated with the QCL indication, the dropping rule indicating a portion of the plurality of QCL parameters to be dropped; and send the QCL indication and the dropping rule to a UE.

According to one aspect of the present disclosure, there is provided a communication method, comprising: communication method, comprising: receiving, from a base station, a quasi co-location (QCL) indication regarding a QCL assumption between a first antenna port and a second antenna port, the QCL indication referencing a plurality of QCL parameters; according to a dropping rule associated with the QCL indication, dropping a portion of the plurality of QCL parameters; and establishing a QCL relation between the first antenna port and the second antenna port with respect to remaining QCL parameters referenced in the QCL indication.

According to one aspect of the present disclosure, there is provided a communication method, comprising: generating a quasi co-location (QCL) indication regarding a QCL assumption between a first antenna port and a second antenna port, the QCL indication referencing a plurality of QCL parameters; determining a dropping rule associated with the QCL indication, the dropping rule indicating a portion of the plurality of QCL parameters to be dropped; and sending the QCL indication and the dropping rule to a UE.

According to one aspect of the present disclosure, there is provided a computer program product comprising executable instructions which, when executed, perform any of the above communication methods.

DESCRIPTION OF THE DRAWINGS

A better understanding of the present disclosure may be achieved by referring to a detailed description given hereinafter in connection with accompanying figures, wherein the same or similar reference signs are used to indicate the same or similar elements throughout the figures. The figures are included in the specification and form a part of the specification along with the following detailed descriptions, for further illustrating embodiments of the present disclosure and for explaining the theory and advantages of the present disclosure. Wherein.

Further features and aspects of the present disclosure will become apparent from the following description with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all features of the embodiments are described in the specification. It should be noted that, however, many implementation-specific settings may be made in practicing the embodiments of the present disclosure according to specific requirements, so as to achieve specific goals of the developers, such as for compliance with constraints related to a device and a service, which may vary from implementations.

In addition, it should be noted that to protect the present disclosure from being obscured by unnecessary details, the figures illustrate only steps of a process and/or components of a device that are closely related to technical solutions according to the present disclosure, while other details that have little relation to the present disclosure are omitted.

For convenient explanation of the technical solutions of the present disclosure, various aspects of the present disclosure will be described below in context of the 5G NR. However, it should be noted that this is not a limitation on the scope of application of the present disclosure. One or more aspects of the present disclosure can also be applied to various existing wireless communication systems, such as the 4G LTE/LTE-A, or various wireless communication systems to be developed in future. The architecture, entities, functions, processes and the like as described in the following description are not limited to those in the NR communication system, and can be found in other communication standards.

Figure 1:
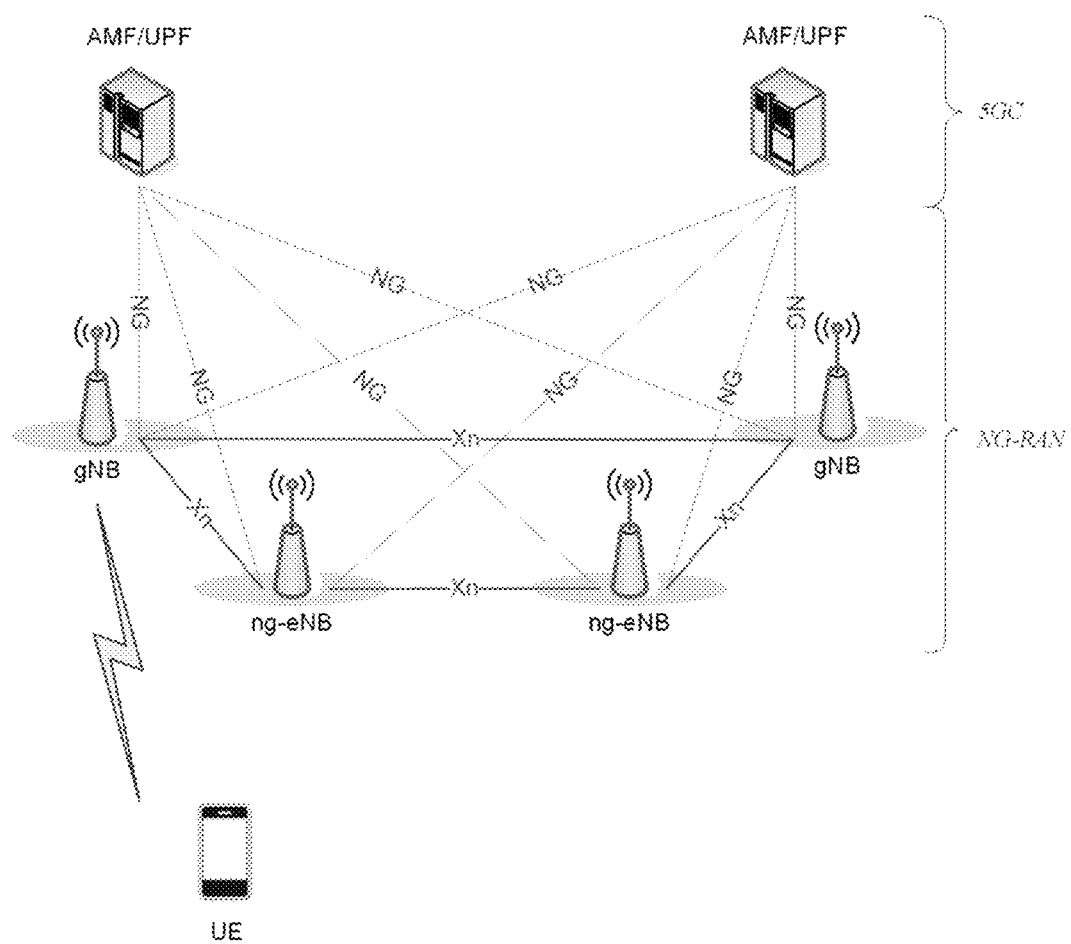
FIG. 1 is a simplified diagram illustrating architecture of a NR communication system.

FIG. 1 is a simplified diagram illustrating an architecture of the NR communication system. As shown in FIG. 1, on the network side, radio access network (NG-RAN) nodes of the NR communication system include gNBs and ng-eNBs, wherein the gNB is a newly defined node in the 5G NR communication standard, which is connected to a 5G core network (5GC) via a NG interface and provides NR user plane and control plane protocols terminating with a terminal equipment (also referred to as "user equipment", simply referred to hereinafter as "UE"); the ng-eNB is a node defined to be compatible with the 4G LTE communication system, which can be upgradation of an evolved Node B (eNB) of the LTE radio access network, is connected to the 5G core network via the NG interface, and provides user plane and control plane protocols for evolved universal terrestrial radio access (E-UTRA) terminating with the UE. Hereinafter. The gNB and ng-eNB are collectively referred to as a "base station".

It should be noted that the term "base station" used in the present disclosure is not limited to the above two kinds of nodes, but is taken as an example of a control device on the network side and has the full breadth of its general meaning. For example, in addition to the gNB and ng-eNB specified in the 5G communication standard, the "base station" may also be, for example, an eNB in the LTE communication system, a remote radio head, a wireless access point, a control node in an automated plant, or a communication device that performs similar functions, depending on scenarios to which the technical solutions of the present disclosure are applied. Application examples of the base station will be described in detail in the following chapter.

In addition, the term "UE" in the present disclosure has its full breadth of general meaning, including various terminal devices or vehicle-mounted devices that communicate with a base station. For example, the UE may be a terminal device such as a mobile phone, a laptop, a tablet, a vehicle-mounted communication device, sensors and effectors in an automated plant or the like, or elements thereof. Application examples of the UE will be described in detail in the following chapter.

In a wireless communication system such as the 5G NR, both of the base station and the UE have many antennas, for example, tens, hundreds or even thousands of antennas, to enable application of Multiple Input Multiple Output (MIMO) technology. With respect to an antenna model, a mapping relationship of three levels is generally defined around antennas, so that the antenna model can be smoothly adapted to the channel model and the communication standard.

At the bottom level is the most basic physical units, antennas, which can also be called antenna elements. Each of the antenna elements radiates an electromagnetic wave according to respective amplitude parameter and phase parameter.

The antenna elements are arranged as one or more antenna arrays in a matrix form. An antenna array may be composed of antenna elements in a single row, a single column, multiple rows or multiple columns. At this level, each antenna array actually constitutes a Transceiver Unit (TXRU). Each TXRU can be independently configured. Adjustment of an antenna pattern of the TXRU is realized by configuring the amplitude parameters and/or the phase parameters of the antenna elements forming the TXRU, and electromagnetic wave radiations emitted by all antenna elements in the antenna array form a narrow beam pointing to a specific spatial direction, that is, beamforming is realized.

Finally, one or more TXRUs construct antenna ports seen at a system level through logical mapping. An antenna port is defined such that a channel on which a symbol of the antenna port is transmitted can be inferred from a channel on which another symbol of the same antenna port is transmitted. The TXRU is equivalent to the antenna port when there is a one-to-one mapping relationship between the TXRU and the antenna port. Of course, two or more TXRUs may collectively constitute one antenna port, depending on the system configuration.

Different antenna ports may be located at the same location or different locations. Due to different locations, different distances from the UE, different signal paths or the like, signals on the antenna ports at different locations may have obviously different large-scale properties. However, if the distance between the antenna ports is not significant, the antenna ports at different locations may have similar large-scale properties, and then it can be assumed that the large-scale properties between these antenna ports are identical, that is, they are quasi co-located. It means that when two antenna ports satisfy a QCL relation, the large-scale property parameters of a channel estimated from signals on one antenna port are also suitable for signals on another antenna port.

The large-scale properties of a channel include at least one of Doppler shift, Doppler spread, average delay, delay spread, average gain, and spatial reception parameters. The average delay can include first-order statistics of time characteristics of the channel. The delay spread can include second-order statistics of the time characteristics of the channel. The Doppler shift can include first-order statistics of frequency characteristics of the channel. The Doppler spread can include second-order statistics of the frequency characteristics of the channel. The average gain can include first-order statistics of magnitude characteristics of the channel. The spatial reception parameters can be embodied as a spatial domain filter.

Antenna ports may be characterized by reference signals, and the reference signals can be used for channel estimation or for processing physical channels transmitted on the same antenna ports, such as Physical Downlink Shared Channel (PDSCH), Physical Downlink Control Channel (PDCCH) or the like. There is a one-to-one correspondence between the antenna port and its reference signal, and different antenna ports are used to transmit different reference signals. The reference signal includes, for example, Synchronization Signal Block (SSB), channel state information reference signal (CSI-RS), Sounding Reference Signal (SRS), or the like. For this reason, when the QCL relation is described below, sometimes we say that there is a QCL relation between two reference signals or transport channels multiplexed with the reference signals, and sometimes we say that there is a QCL relation between two antenna ports, which have no substantive difference in meaning.

Figure 2:
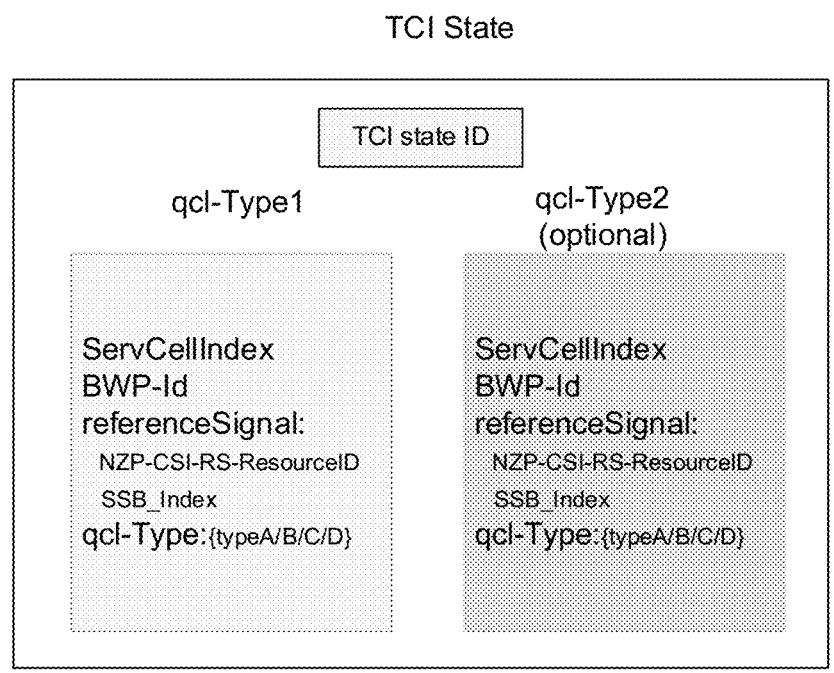
FIG. 2 is a configuration diagram illustrating a TCI state.

Typically, the base station can employ an indication mechanism with TCI states to indicate the QCL relation between the reference signals. FIG. 2 is an exemplary configuration diagram illustrating a TCI state. As shown in FIG. 2, the TCI state is identified by a TCI state ID. Each TCI state contains a QCL assumption for configuring the QCL relation between one or two downlink reference signals and a DMRS port of PDCCH or PDSCH. For the first downlink reference signal, this QCL relation is configured by qcl-Type1. If there is the second downlink reference signal, the QCL relation is configured by optional qcl-Type2. As shown in FIG. 2, qcl-Type1 or qcl-Type2 includes the following information:

Serving cell index (ServCellIndex), which represents a serving cell where the reference signal is located;

Bandwidth part ID (BWP-Id), which represents a downlink bandwidth part where the reference signal is located;

Reference Signal (referenceSignal), which represents a source reference signal resource for providing QCL information, including NZP-CSI-RS resource identified by NZP-CSI-RS-ResoureId or SSB resource identified by SSB-Index;

QCL type (qcl-Type), which represents a QCL type corresponding to the listed downlink reference signal.

Depending on the large-scale property of the wireless channel that needs to be inferred, the QCL type qcl-Type involved in the TCI state may include the following options:

"QCL-TypeA": with respect to {Doppler shift, Doppler spread, average delay, delay spread};

"QCL-TypeB": with respect to {Doppler shift, Doppler spread};

"QCL-TypeC": with respect to {Doppler shift, average delay};

"QCL-TypeD": with respect to {spatial reception parameters}.

It can be seen that QCL-TypeA contains all of the time-domain characteristics (i.e., "average delay", "delay spread", hereinafter referred to as "time-domain QCL parameters") and the frequency-domain characteristics (i.e., "Doppler shift", "Doppler spread", hereinafter referred to as "frequency-domain QCL parameters"), and QCL-TypeB and QCL-TypeC can be considered as proper subsets of QCL-TypeA. Furthermore, to avoid ambiguity, each TCI state is typically allowed to contain only one QCL assumption of the type QCL-TypeD.

In use, the base station may pre-configure, to the UE and via a radio resource control (RRC) parameter (e.g., PDSCH_Config or the like), a TCI state pool which includes up to, for example, 64 TCI states. The TCI state pool may be configured per BWP. Different indication procedures may be employed depending on whether the transport channel for which the QCL relation is indicated is a control channel or a data channel. For example, for a control channel such as PDCCH, the base station may directly activate (or indicate) one of the TCI states in the TCI state pool through a Medium Access Control (MAC) Control Element (CE); however, a data channel such as PDSCH is more sensitive to changes in the channel environment, and an indication method with MAC CE plus more flexible physical-layer signaling may be used, that is, the base station activates at most 8 TCI states in the TCI state pool through a MAC CE, and then dynamically indicates one of the activated TCI states by using a Downlink Control Information (DCI) as needed. Although the current indication method with MAC CE plus DCI is generally used for PDSCH, there is a possibility that it is also used for PDCCH.

As can be seen from the brief introduction above, the effectiveness of the QCL indication mechanism depends largely on design and configuration of the TCI state pool. However, since the TCI states can indicate the QCL relation of only the four types QCL-TypeA to QCL-TypeD, and the number of configurable TCI states is limited, it may end up with a lack of TCI states suitable for the QCL indication in some application scenarios. Defining more QCL types or configuring more TCI states may be a solution, but this may disadvantageously lead to a complicated design of the TCI state pool as well as increased signaling overhead for the RRC pre-configuration.

In view of these, the present disclosure improves the applicability by controlling selection of QCL parameters involved in the existing TCI states. Exemplary embodiments of the present disclosure will be described in detail below with reference to the accompanying drawings.

Figure 3A:
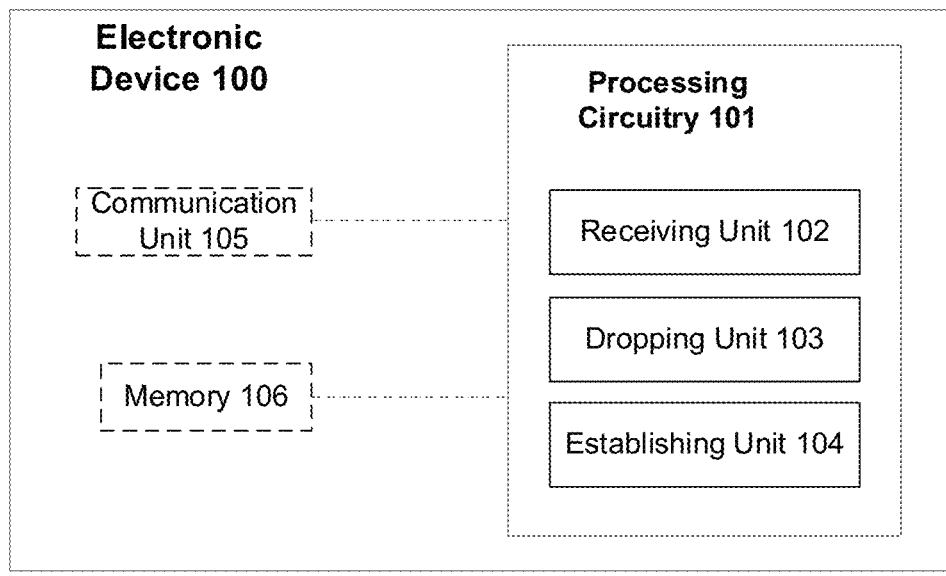
FIGS. 3A and 3B illustrate an electronic device on UE side and a communication method thereof according to an embodiment.
Figure 3B:
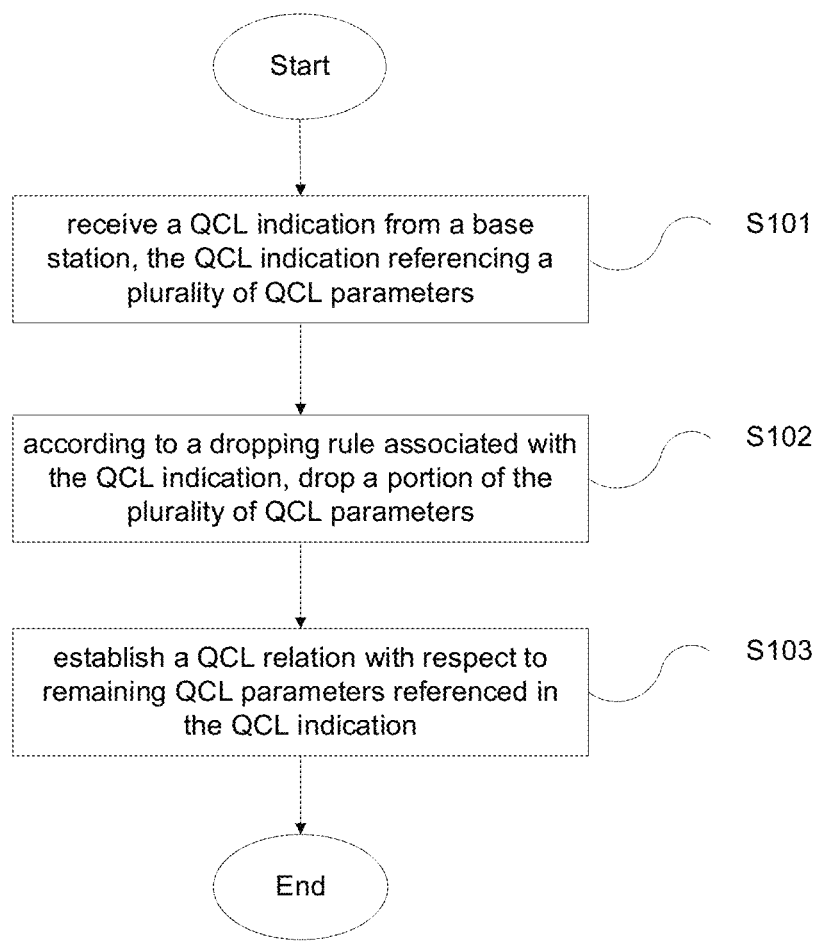

FIG. 3A is a block diagram illustrating an electronic device 100 on UE side according to the embodiments of the present disclosure, and FIG. 3B is a flow diagram of a communication method that can be performed by the electronic device 100. The electronic device 100 may be a UE or a component thereof.

As shown in FIG. 3A, the electronic device 100 includes processing circuitry 101. The processing circuitry 101 includes at least a receiving unit 102, a dropping unit 103, and an establishing unit 104. The processing circuitry 101 may be configured to perform the communication method shown in FIG. 3B. The processing circuitry 101 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

The receiving unit 102 in the processing circuitry 101 is configured to receive a QCL indication regarding a QCL assumption between a first antenna port and a second antenna port, that is, to perform step S101 in FIG. 3B. The QCL indication may be information that indicates one TCI state in a TCI state pool pre-configured to the UE, and this TCI state can provide an assumption for an intended QCL relation between the first antenna port and the second antenna port, and includes a source reference signal that provides the QCL information, and a plurality of QCL parameters. Here, the QCL parameters referenced in the QCL indication can include other QCL parameters in addition to the intended QCL parameters.

Figure 5:
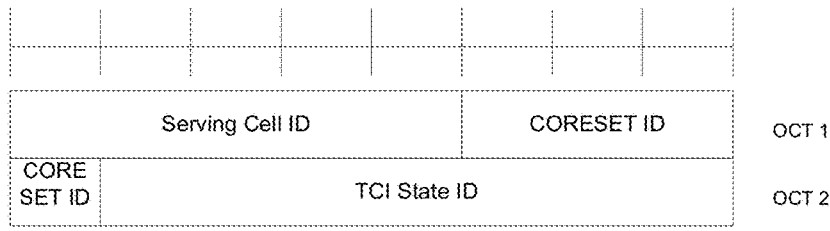
FIG. 5 illustrates a MAC CE used to activate a TCI state for a control channel.

The QCL indication may be carried by MAC-layer signaling and/or physical-layer signaling. FIG. 5 illustrates a format of MAC CE for activating a TCI state for PDCCH (without a header). As shown in FIG. 5, "Serving Cell ID" denotes a serving cell to which the MAC CE is applicable, and occupies 5 bits; "CORESET ID" denotes a control resource set (CORESET) where the PDCCH is located, and occupies 4 bits; "TCI State ID" denotes a TCI state determined for the PDCCH, and occupies 7 bits. The base station can provide the QCL relation by writing an intended TCI state ID in the MAC CE shown in FIG. 5.

Figure 6:
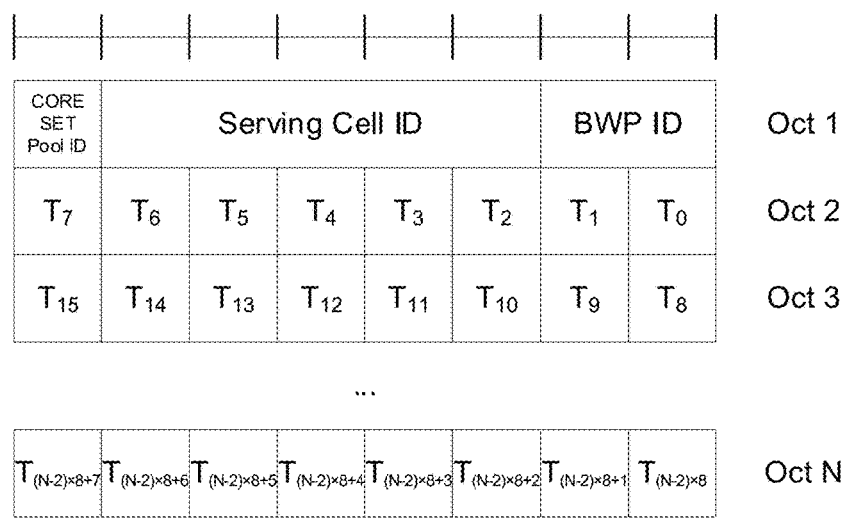
FIG. 6 illustrates a MAC CE used to activate a TCI state for a data channel.
Figure 7:
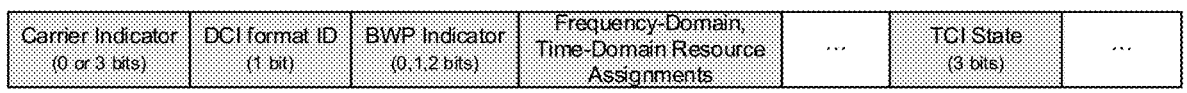
FIG. 7 illustrates an exemplary diagram of a format of downlink control information (DCI)

For PDSCH, the base station provides the QCL relation by MAC CE plus DCI. FIG. 6 illustrates a format of the MAC CE for activating TCI states (without a header). As shown in FIG. 6, "Serving Cell ID" denotes a serving cell to which the MAC CE is applicable, and occupies 5 bits; "BWP ID" denotes a downlink bandwidth part to which the MAC CE is applicable, and occupies 2 bits; "Ti" denotes activation information for a configured TCI state pool, occupies 1 bit, and if set to 1, indicates that the corresponding TCI state is activated, otherwise indicates that the corresponding TCI state is not activated; "CORESET Pool ID" denotes a CORESET to which mapping between an activated TCI state and a codepoint in DCI is directed, and occupies 1 bit. FIG. 7 illustrates a DCI format that may be used to specify a TCI state, such as DCI format 1_1 or 1_2 specified by 3GPP R16. As shown in FIG. 7, in addition to information on the DCI format, a component carrier, BWP, time-frequency resources and the like, the DCI may contain an identification field for the TCI state, which occupies 3 bits for indicating one of up to 8 TCI states activated by the MAC CE shown in FIG. 6.

The dropping unit 103 is configured to drop a portion of the plurality of QCL parameters according to a dropping rule associated with the QCL indication received by the receiving unit 102, that is, to perform step S102 in FIG. 3B. The dropping rule may include information that explicitly defines whether to drop one or more QCL parameters as predetermined or which/what QCL parameters to be dropped. Alternatively or additionally, the dropping rule may implicitly define the QCL parameters to be dropped by specifying which/what QCL parameters should be used. As described in detail below, the dropping rule may be represented in the form of a bitmap or a codepoint value. In one example, the base station can send the dropping rule to the UE using the MAC CE or DCI that carries the QCL indication; In another example, the base station can to pre-configure the dropping rule to the UE using a RRC parameter without involvement of dynamic signaling.

An ultimate purpose of the dropping unit 103 is to determine, from the plurality of QCL parameters referenced in the QCL indication, parameters with respect to which the QCL relation is intended to be established. Therefore, the operation of the dropping unit 103 to drop the QCL parameters can be performed either by identifying or selecting partial parameters (the intended parameters) from the plurality of QCL parameters for use by the establishing unit 104, or by excluding partial parameters (unintended parameters) from the plurality of QCL parameters so that remaining parameters can be used by the establishing unit. In other words, "drop" as described in the present disclosure may be achieved by disabling a subset of the QCL parameters referenced in the QCL indication, or by enabling the remainder of that subset.

The establishing unit 104 is configured to establish a QCL relation between the first antenna port and the second antenna port with respect to the remaining QCL parameters referenced in the QCL indication, that is, to perform step S103 in FIG. 3B. The establishing unit 104 finds a source reference signal (such as SSB or CSI-RS) that provides the QCL information based on the QCL indication. The establishing unit 104 will not take into account the QCL parameters dropped by the dropping unit 103, in other words, the establishing unit 104 will not use these parameters previously for receiving the source reference signal, or rather, the establishing unit 104 will use the parameters previously for receiving the source reference signal that are not indicated to be dropped, in receiving upcoming PDCCH or PDSCH.

The electronic device 100 may further include, for example, a communication unit 105 and a memory 106.

The communication unit 105 may be configured to communicate with a base station device (e.g., an electronic device 200 to be described below) under the control of the processing circuitry 101. In one example, the communication unit 105 may be implemented as a transmitter or transceiver, including communication components such as antenna arrays and/or radio frequency links. The communication unit 105 is depicted with a dashed line, since it may also be located outside the electronic device 100.

The electronic device 100 may also include the memory 106. The memory 106 may store various data and instructions, programs and data for operation of the electronic device 100, various data generated by the processing circuitry 101, data received by the communication unit 105, and the like. The memory 106 may be a volatile memory and/or a non-volatile memory. For example, the memory 106 may include, but are not limited to, Random Access Memory (RAM), Dynamic Random Access Memory (DRAM), Static Random Access Memory (SRAM), Read Only Memory (ROM), flash memory.

Figure 4A:
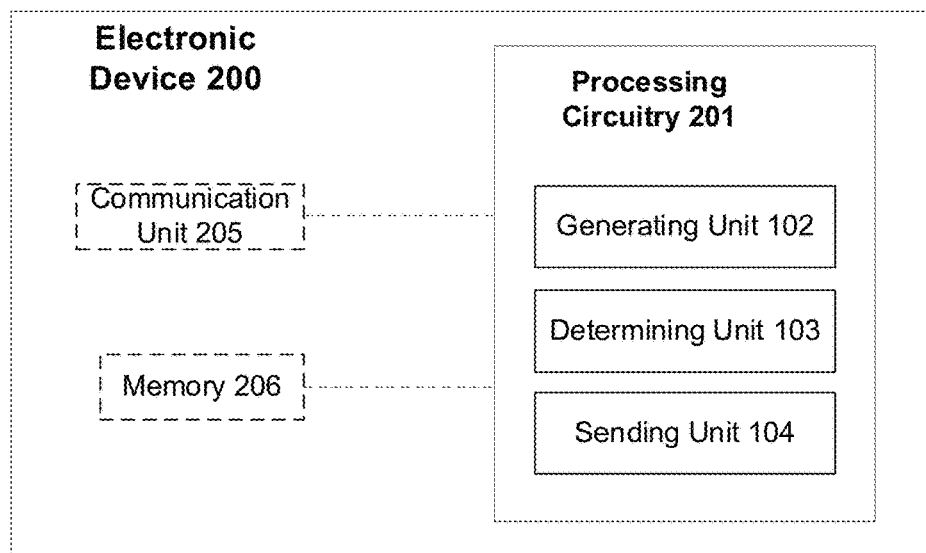
FIGS. 4A and 4B illustrate an electronic device on base station side and a communication method thereof according to an embodiment.

FIG. 4A is a block diagram illustrating an electronic device 200 according to the present disclosure. The electronic device 100 may be a base station device or a component thereof.

As shown in FIG. 4A, the electronic device 200 includes processing circuitry 201. The processing circuitry 201 includes at least a generating unit 202, a determining unit 203, and a sending unit 204. The processing circuitry 201 may be configured to perform the communication method shown in FIG. 4B. The processing circuitry 201 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

Figure 4B:
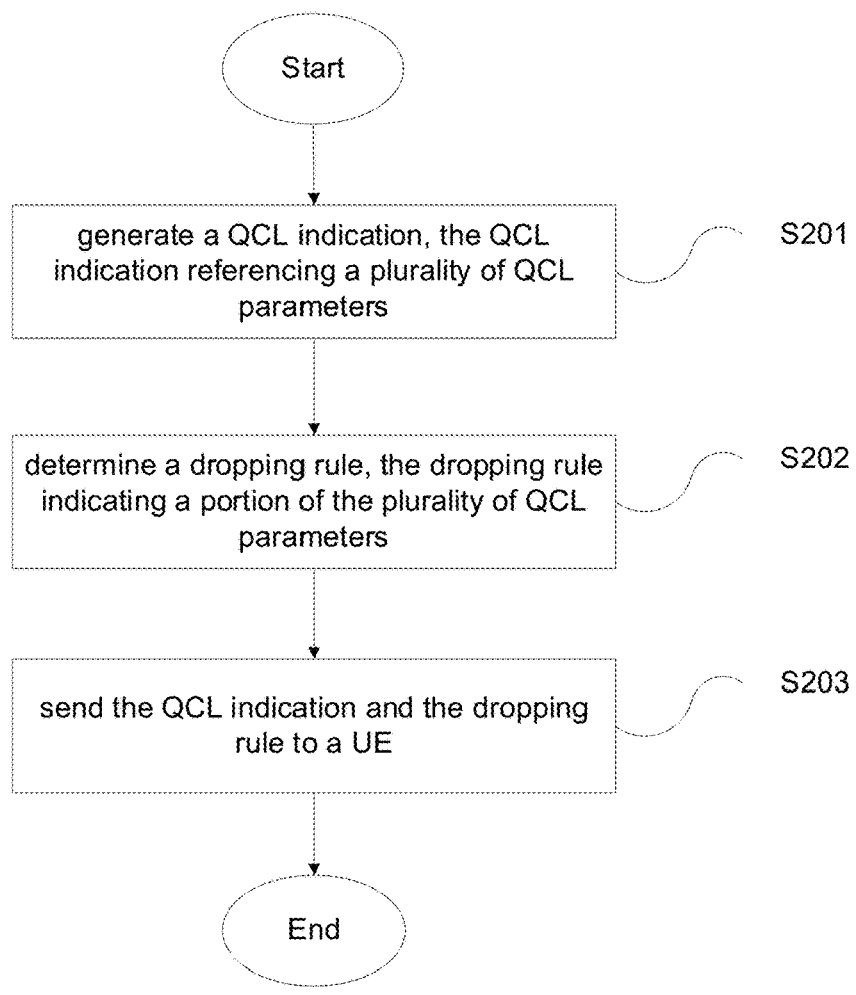

The generating unit 202 in the processing circuitry 201 is configured to generate a QCL indication regarding a QCL assumption between a first antenna port and a second antenna port, that is, to perform step S201 in FIG. 4B. The QCL indication may reference one TCI state in a TCI state pool pre-configured to the UE, and this TCI state can provide an assumption for an intended QCL relation between the first antenna port and the second antenna port, and includes a source reference signal that provides the QCL information, and a plurality of QCL parameters. Here, the QCL parameters referenced in the QCL indication can include other QCL parameters in addition to the intended QCL parameters.

The determining unit 203 is configured to determine a dropping rule associated with the generated QCL indication, that is, to perform step S202 in FIG. 4B. The dropping rule is used for indicating that the unintended QCL parameters referenced in the QCL indication are dropped, and only the QCL parameters intended in establishing the QCL relation are maintained. The dropping rule may be determined in association each time the QCL indication is generated, or may be determined in advance and pre-configured to the UE, and work on subsequent QCL indications of the same type.

The sending unit 204 is configured to send the QCL indication and the dropping rule to the UE, that is, to perform step S203 in FIG. 4B. In one example, the dropping rule may be embodied in MAC-layer signaling (MAC CE) or physical-layer signaling (DCI) for conveying the QCL indication; In another example, the dropping rule is not necessarily sent with the QCL indication, but is pre-configured to the UE through a RRC parameter. The dropping rule may be represented, for example, in the form of a bitmap or a codepoint value.

The electronic device 200 may further include, for example, a communication unit 205 and a memory 206.

The communication unit 205 may be configured to communicate with a UE (e.g., the electronic device 100 described above) under the control of the processing circuitry 201. In one example, the communication unit 205 may be implemented as a transmitter or transceiver, including communication components such as antenna arrays and/or radio frequency links. The communication unit 205 is depicted with a dashed line, since it may also be located outside the electronic device 200.

The electronic device 200 may also include the memory 206. The memory 206 may store various data and instructions, such as programs and data for operation of the electronic device 200, various data generated by the processing circuitry 201, various control signaling or traffic data to be transmitted by the communication unit 205, and the like. The memory 206 is depicted with a dashed line because it may also be located within the processing circuitry 201 or outside the electronic device 200. The memory 206 may be a volatile memory and/or a non-volatile memory. For example, the memory 206 may include, but are not limited to, Random Access Memory (RAM), Dynamic Random Access Memory (DRAM), Static Random Access Memory (SRAM), Read Only Memory (ROM), flash memory.

It should be noted that various units of the electronic devices 100 and 200 described in the above embodiments are only logical modules divided according to specific functions implemented by the units, and are not intended to be limited to the specific implementations. In an actual implementation, the above units may be implemented as independent physical entities, or may also be implemented by a single entity (for example, a processor (CPU or DSP, etc.), an integrated circuit, etc.).

Embodiments of the present disclosure will be described below mainly taking a downlink Single Frequency Network (SFN) in the 5G communication system as an exemplary application scenario, however, it should be noted that this is only for convenience of explaining and understanding, and does not limit the applicable scope of the present disclosure thereto.

Figure 8:
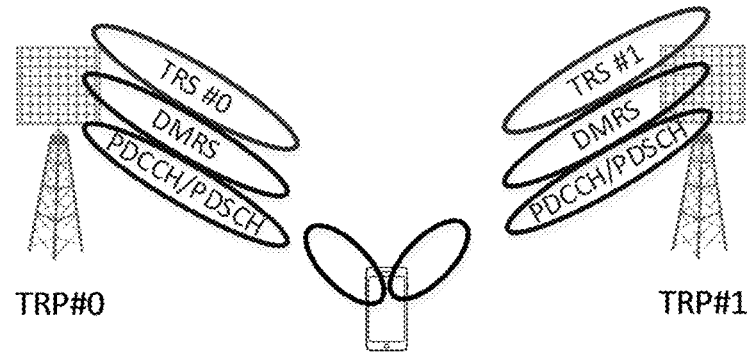
FIG. 8 illustrates a schematic diagram an SFN transmission mode with two TRPs.

In a scenario of high-speed movement, the communication network may select two or more transmit receive points (TRPs) to operate in a Single Frequency Network (SFN) mode so as to enhance downlink coverage. FIG. 8 shows a schematic diagram of the SFN transmission mode of two TRPs (i.e., TRP #0 and TRP #1). It should be noted that the number of TRPs is not limited to two, but may be three or more. A TRP is generally defined as antenna arrays of a base station (e.g., a gNB) that are located at a particular geographic location, and a base station may have one or more TRPs. In addition, TRP #0 and TRP #1 may belong to the same base station or different base stations, in which case the two base stations may exchange information with each other, for example, via an Xn interface.

As shown in FIG. 8, first, each TRP may transmit a respective Tracking Reference Signal (TRS), that is, two TRSs may use different time-frequency resources and different sequences generated by reference signals, for the UE to estimate frequency-domain information and time-domain information from each TRP, where the TRS is transmitted in a TRP-specific manner. However, PDCCH/PDSCH and corresponding DMRS utilize the SFN transmission mode, that is, although transmitted from the two TRPs to the UE, they use exactly the same time-frequency resources and sequences generated by reference signals. Stated differently, if the UE is not informed, the UE cannot distinguish between the transmission from a single TRP or the SFN transmission from 2 TRPs.

Figure 9:
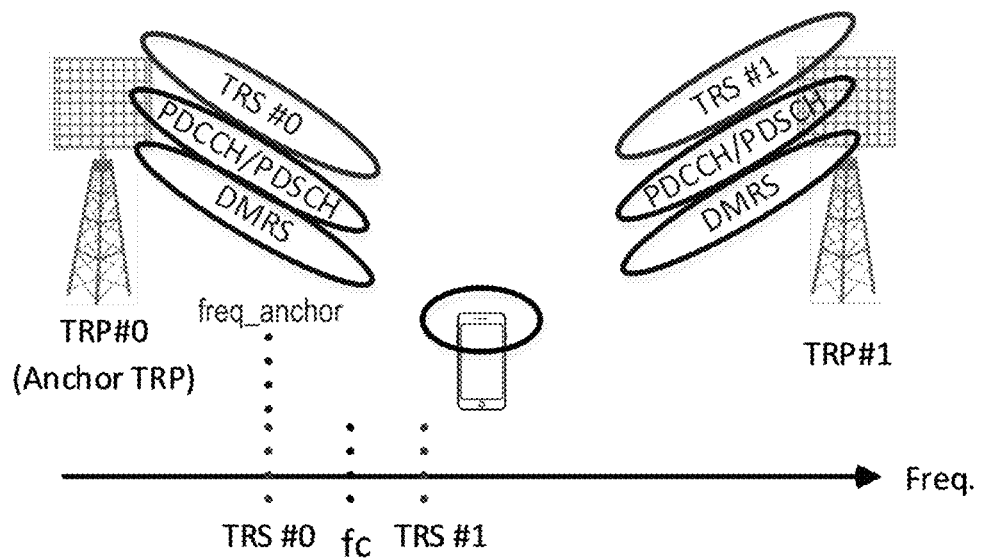
FIG. 9 illustrates a schematic diagrams of frequency points at which Doppler-shifted signals from two TRPs are received.

When the UE is moving at a high speed, it tends to be along a fixed moving path, getting farther from TRPs of a base station and closer to TRPs of another base station. This causes a phenomenon that transmissions from different TRPs to the UE have different Doppler shifts. As shown in FIG. 9, it is assumed that a central frequency point at which the communication network transmits TRSs is fc, but due to the Doppler effect, carrier frequencies (hereinafter also referred to as "frequency points") at which the UE receives TRS #0 from TRP #0 and TRS #1 from TRP #1 are offset differently.

In order to realize single-frequency reception at the UE, it has been proposed that one of the TRPs performs pre-compensation for the Doppler shift, so that the center frequency at which the UE receives signals from this TRP exactly coincides with the frequency point of signals from another TRP. Assuming that TRP #0 is an anchor TRP, TRP #1 needs to perform the Doppler shift pre-compensation so that the center frequency at which the signals from TRP #1 are received by the UE becomes the center frequency at which the signals from TRP #0 are received by the UE (i.e., freq_anchor as shown in FIG. 9), which is a received frequency point of the signals from TRP #0 after the Doppler shift.

Figure 10:
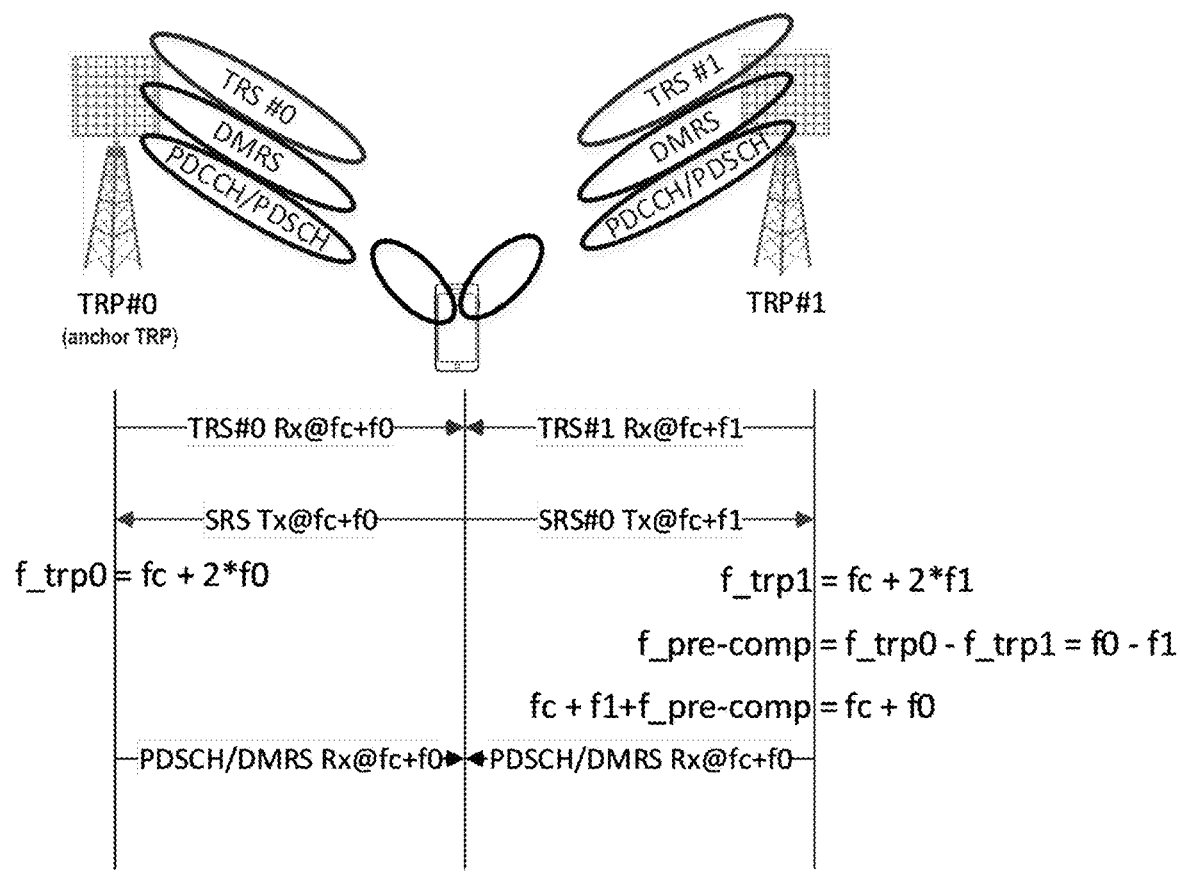
FIG. 10 illustrates a process for Doppler shift pre-compensation.

The process of the Doppler shift pre-compensation will be briefly described herein with reference to FIG. 10. As shown in FIG. 10, the process may include the following steps:

the first step where TRP #0 and TRP #1 respectively transmit TRS #0 and TRS #1 at the same frequency point fc, and due to different Doppler shifts, the UE receives TRS #0 at a frequency point fc+f0 and receives TRS #1 at a frequency point fc+f1;

the second step where the UE transmits different SRSs to corresponding TRPs at the frequency points where the TRSs are received, that is, the UE transmits a SRS to TRP #0 at the frequency point fc+f0 and transmits a SRS to TRP #1 at the frequency point fc+f1. Also, due to the Doppler effect, TRP #0 receives the SRS at a frequency point f_trp0=fc+2f0, and TRP #1 receives the SRS at a frequency point f_trp1=fc+2f1;

the third step where the base station can measure the SRSs at the two TRPs to estimate a Doppler shift of 2 times (the Doppler shift of 1 time is from the transmission of the downlink TRS, and the Doppler shift of the other 1 time is from the transmission of the uplink SRS);

the fourth step where the base station calculates a difference between the Doppler shifts of the two TRPs as a pre-compensation amount, that is, f_pre-comp= (f_trp0−f_trp1)/2=f0−f1, and TRP #1 compensates the frequency point for transmitting the downlink signal by the calculated pre-compensation amount, that is, TRP #1 transmits the PDCCH/PDSCH and the DMRS thereof at a frequency point fc+f0−f1, so that the UE receives at the frequency point fc+f0. TRP #0 serving as the anchor TRP does not perform the pre-compensation, and the PDCCH/PDSCH and the DMRS thereof are still transmitted at the frequency point fc, so that the UE also performs reception at the frequency point fc+f0.

Thus, both of the frequency points at which the downlink signals are received by the UE are shifted to the same frequency point freq_anchor=fc+f0, and the reception in the SFN mode is implemented.

Figure 11:
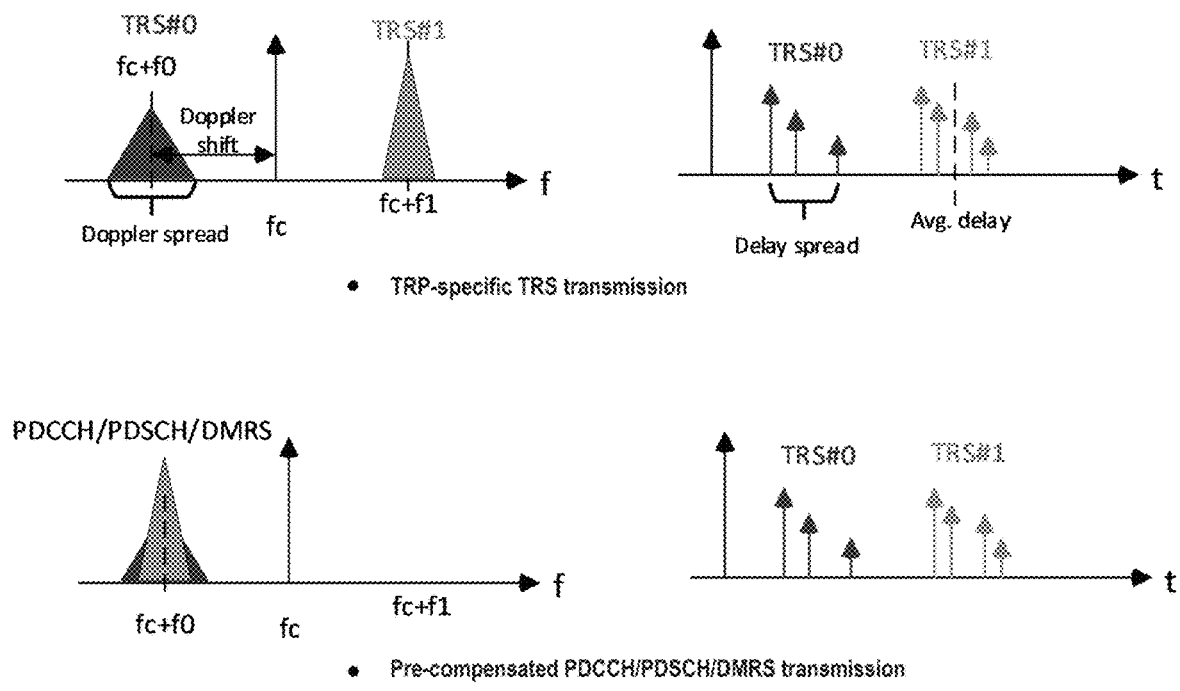
FIG. 11 illustrates frequency-domain and time-domain characteristics of received signals before and after the pre-compensation for the Doppler shift.

FIG. 11 shows frequency-domain characteristics and time-domain characteristics of the received signal before and after the pre-compensation for Doppler shift. In the upper part of FIG. 11, Doppler shift and Doppler spread of TRS #0 and TRS #1 without the pre-compensation are shown on the left, and their average Delay ("avg. Delay") and Delay spread ("Delay spread") are shown on the right.

In the lower part of FIG. 11, Doppler shift and Doppler spread of PDCCH/PDSCH/DMRS with the pre-compensation are shown on the left, and their average delay and delay spread are shown on the right.

As can be seen from FIG. 11, after the Doppler shift pre-compensation is performed on TRP #1, the time-domain characteristics of both TRPs are not changed, but the Doppler spread and Doppler shift in the frequency domain are concentrated in a range. That is, the frequency-domain characteristic of TRS #1 from TRP #1 is no longer applicable to baseband operations such as demodulation of PDCCH/PDSCH/DMRS, but its time domain characteristic is. In the existing QCL indication mechanism, the TCI states of QCL-TypeA, QCL-TypeB, and QCL-TypeC all contain frequency-domain QCL parameters, and if the QCL indication is performed directly by using the TCI states, the UE may not correctly receive signals from TRP #1 by using "Doppler shift" and "Doppler spread" indicated in the TCI states to configure its receiver.

In this case, the QCL indication mechanism based on the dropping rule according to the present disclosure may be applied to "tailor" a QCL assumption containing intended parameters as needed.

First, the base station may perform configuration of the Doppler shift pre-compensation. This may take place in response to the UE including its capability to handle the Doppler shift pre-compensation in a capability report. For example, the protocol may newly define an RRC parameter "enableSFNPreCompensation" to configure such capability. If the base station configures the RRC parameter to be "enabled" for the UE, the UE can know that the base station will transmit PDCCH or PDSCH in the SFN mode, and a part of TRPs of the base station will perform pre-compensation for Doppler shift. This facilitates the UE to understand subsequent signaling and configure the transceiver.

Secondly, in the SFN scenario, both of TRP #0 and TRP #1 need to participate in signal transmissions, and thus the QCL indication needs to be performed for them respectively, so at least 2 TCI states, denoted as TCI state #0 and TCI state #1, need to be transferred, wherein TCI state #0 refers to TRS #0 as the source reference signal for providing QCL information, and TCI state #1 refers to TRS #1 as the source reference signal for providing QCL information. Each of the TCI state may include a QCL assumption of the type QCL-TypeA or QCL-TypeB or QCL-TypeC, to indicate a QCL relation with respect to time-domain parameters and/or frequency-domain parameters. Furthermore, optionally, each of the TCI states may also include a QCL assumption of the type QCL-TypeD to indicate a QCL relation with respect to spatial-domain parameters (i.e., beams).

Figure 12:
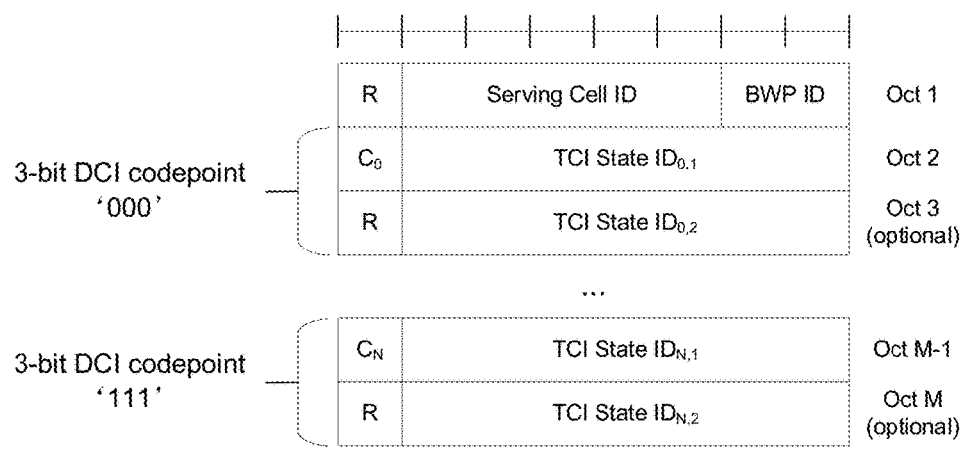
FIG. 12 illustrates an enhanced TCI state activation/deactivation MAC CE.

From the perspective of MAC-layer signaling, TCI state #0 and TCI state #1 configured for the UE can be activated simultaneously using "enhanced TCI state activation/deactivation MAC CE" provided in the 3GPP Release 16. FIG. 12 shows a format of such MAC CE, wherein "Serving Cell ID" and "BWP ID" fields denote a serving cell and a downlink BWP to which the MAC CE is applicable, respectively; the "Co" field denotes whether there is an octet containing an optional TCI state ID; "R" is a reserved field; "TCI State $ID_{i,j}$" field denotes a TCI state determined for PDSCH, i is an index of a codepoint of the "TCI state" field of the DCI as shown in FIG. 7, for example, TCI state $ID_{0,1}$ and TCI state $ID_{0,2}$ correspond to a 3-bit codepoint "000" of the DCI, TCI state $ID_{1,1}$ and TCI state $ID_{1,2}$ correspond to a 3-bit codepoint "001" of the DCI, and so on. For each codepoint i of the "TCI state" field of the DCI, TCI state #0 and TCI state #1 may be set in TCI state $ID_{1,1}$ and TCI state ID$_{1,2}$ of the MAC CE, thereby simultaneously activating two TCI states corresponding to TRP #0 and TRP #1. On the UE side, when a MAC CE in which any DCI codepoint contains two TCI states is received, the UE knows that two TRPs will perform PDSCH transmissions in the SFN mode. It should be noted that the MAC CE shown in FIG. 12 is not limited to two TCI states per codepoint, and more optional TCI state ID fields may be added to activate TCI states corresponding to three or more TRPs simultaneously.

The base station may then use the DCI as shown in FIG. 7 to provide a further QCL indication. Specifically, the UE may extract IDs of corresponding two TCI states from the MAC CE based on the value of the "TCI state" field (i.e., the codepoint value) in the DCI, so as to find the corresponding TCI states.

For PDCCH, the number of TCI states activated for CORESET can be controlled to be 2 so as to inform the UE that downlink transmissions will be from 2 TRPs. Here, for CORESET #0, which is a special cell-specific control channel, 2 TCI states may also be activated for the UE that has entered the RRC connected state, so that the UE keeps being informed of the SFN transmission mode during blind detections of the PDCCH. This can be achieved by modifying the MAC CE format shown in FIG. 5, for example by adding "CORESET ID" and "TCI State ID" fields to set TCI state #0 and TCI state #1 corresponding to TRP #0 and TRP #1, respectively.

In addition, there is a tendency to indicate for PDCCH by using the QCL indication for PDSCH. Therefore, the QCL indication with MAC CE plus DCI as described above for PDSCH may also be similarly applied to PDCCH, which is not described here again.

When using the pre-compensation technique for Doppler shift, the following combinations of QCL parameters that allow to be involved in establishing a QCL relation for TRP #0 and TRP #1 are desirable:

Variant A: {Doppler shift, Doppler spread, average delay, delay spread}+{average delay, delay spread};
Variant B: {Doppler shift, Doppler spread}+{average delay, delay spread};
Variant C: {Doppler shift, Doppler spread, average delay, delay spread}+{average delay}.

In the various combinations described above, for TRP #0, the intended QCL parameters may be referenced in TCI State #0 of either the type QCL-TypeA or QCL-TypeB. For TRP #1, the time-domain QCL parameters may be referenced in TCI state #1 of either the type QCL-TypeA or QCL-TypeC, but inapplicable frequency-domain QCL parameters are also indicated to the UE. According to the embodiments of the present disclosure, the base station may further send a dropping rule (DR) to the UE to indicate unintended QCL parameters to be dropped.

For example, the dropping rules may be in the form of a bitmap, where each bit in the bitmap may take a different value to indicate whether corresponding one or more QCL parameters are to be dropped. In one example, for the frequency-domain QCL parameters and the time-domain QCL parameters, the dropping rule may employ 2 bits to indicate whether to be dropped, respectively, that is, if the first bit takes the value '1', it indicates to drop the frequency-domain QCL parameters "Doppler shift" and "Doppler spread"; and if the second bit takes the value of '1', it indicates to drop the time-domain QCL parameters "average delay" and "delay spread"; otherwise, it indicates not to drop. In another example, for "Doppler shift", "Doppler spread", "average delay" and "delay spread", the dropping rule may indicate with 4 bits whether to be dropped, respectively, that is, if the first, second, third or fourth bit takes the value '1', then the corresponding QCL parameter is dropped, respectively; otherwise, it is not dropped.

As an example, the following Tables 1 and 2 schematically show the TCI states and the dropping rules in the bitmap form, respectively, that may be used to implement Variants A-C described above:

TABLE 1 dropping rules implemented with 2-bit bitmap

| | TRP#0 | | TRP#1 | |
|---|---|---|---|---|
| | TCI state 1 | Dropping Rule 1 (optional) | TCI state 2 | Dropping Rule 2 |
| Variant A | QCL-TypeA | Null or DR = (0, 0) | QCL-TypeA | DR = (1, 0) |
| Variant B | QCL-TypeB | Null or DR = (0, 0) | QCL-TypeA | DR = (1, 0) |
| Variant C | QCL-TypeA | DR = (0, 1) | QCL-TypeA | DR = (1, 0) |

*For Variant C, a dropping rule DR=(1, 1) may be specifically defined, which indicates that all QCL parameters except "average delay" are dropped.

TABLE 2 dropping rules with 4-bit bitmap

| | TRP#0 | | TRP#1 | |
|---|---|---|---|---|
| | TCI state 1 | Dropping Rule 1 (optional) | TCI state 2 | Dropping Rule 2 |
| Variant A | QCL-TypeA | Null or DR = (0, 0, 0, 0) | QCL-TypeA | DR = (1, 1, 0, 0) |
| Variant B | QCL-TypeB | Null or DR = (0, 0, 0, 0) | QCL-TypeA | DR = (1, 1, 0, 0) |
| | QCL-TypeA | DR = (1, 1, 0, 0) | QCL-TypeA | DR = (1, 1, 0, 0) |
| Variant C | QCL-TypeA | Null or DR = (0, 0, 0, 0) | QCL-TypeA | DR = (1, 1, 0, 1) |

Alternatively, the dropping rule may take the form of a codepoint value. In particular, several dropping schemes may be predefined, each of which is encoded into a different value. In one example, the dropping rule may employ one bit to indicate whether to drop the frequency-domain QCL parameters, for example, if the bit takes a codepoint value of '1', it indicates to drop the frequency-domain QCL parameters; otherwise, it indicates not to drop. In another example, the dropping rule may employ two bits to indicate one of four dropping schemes, for example, a codepoint value of '00' indicates not to drop; a codepoint value of '01' indicates to drop only the time-domain QCL parameters; a code point value '10' indicates to drop only the frequency-domain QCL parameters; a code point value '11' indicates to drop all QCL parameters except "average delay".

By way of example, the following Tables 3 and 4 schematically show the TCI states and the dropping rules in the form of codepoint values, respectively, that may be used to implement Variants A-C described above:

TABLE 3 dropping rules implemented with 1-bit codepoint value

|  | TRP#0 | | TRP#1 | |
| --- | --- | --- | --- | --- |
|  | TCI state 1 | Dropping Rule 1 | TCI state 2 | Dropping Rule 2 |
| Variant A | QCL-TypeA | Null or DR = '0' | QCL-TypeA | DR = '1' |
| Variant B | QCL-TypeB | Null or DR = '0' | QCL-TypeA | DR = '1' |
| Variant C |  |  |  |  |

*For Variant C, the dropping rule DR='1' may be defined to indicate to drop all QCL parameters except "average delay", if needed.

TABLE 4 dropping rules implemented with 2-bit codepoint value

|  | TRP#0 | | TRP#1 | |
| --- | --- | --- | --- | --- |
|  | TCI state 1 | Dropping Rule 1 | TCI state 2 | Dropping Rule 2 |
| Variant A | QCL-TypeA | Null or DR = '00' | QCL-TypeA | DR = '01' |
| Variant B | QCL-TypeB | Null or DR = '00' | QCL-TypeA | DR = '01' |
|  | QCL-TypeA | DR = '10' | QCL-TypeA | DR = '01' |
| Variant C | QCL-TypeA | Null or DR = '00' | QCL-TypeA | DR = '11' |

As shown in Tables 1 to 4 above, no matter what form, the more bits are used, the smaller the granularity of indication is, and the more QCL-parameter dropping schemes can be implemented. In general, only Dropping Rule 2 associated with TCI state #2 may be generated. Alternatively, however, Dropping Rule 1 associated with TCI state #1 may also be generated for the purpose of symmetry. The presence of Dropping Rule 1 helps to expand the applicability of the TCI state #1, for example, as shown in the above tables, when TCI state #1 referencing TRS #0 is of only the type QCL-TypeA, Dropping Rule 1 may be used to indicate to drop the time-domain QCL parameters. At this time, TCI State #1 of the type QCL-TypeA implements a QCL assumption of the type QCL-TypeB in conjunction with Dropping Rule 1.

Figure 13:
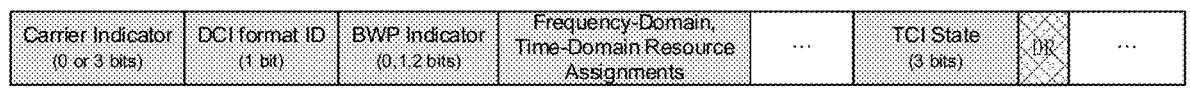
FIG. 13 illustrates a DCI format for conveying a dropping rule.

The dropping rule may be sent to the UE in various signaling. Preferably, the dropping rule may be sent by the signaling carrying the associated QCL indication. For example, for PDSCH (potentially also applicable to PDCCH), in addition to containing the "TCI State" field, DCI may add a "DR" field denoting the dropping rule, as shown in FIG. 13. The "DR" field may be a bitmap or a codepoint value as described above, occupying 1 bit, 2 bits, 4 bits or the like, depending on the particular representation of the dropping rule.

Alternatively, the dropping rule may be sent through the MAC CE carrying the associated QCL indication. Referring to FIG. 12, the reserved field "R" in each optional octet may be utilized to convey the dropping rule for the TCI state referenced in this octet. For each codepoint i of the DCI, TCI state $ID_{i,2}$ identifies TCI state #1 indicated for TRP #1. If the TCI state references a QCL assumption of the type QCL-TypeA:

considering Variant A and Variant B, it can be defined, if "R"=0, to indicate no drop; if "R"=1, to indicate that the frequency-domain QCL parameters referenced in the TCI state identified by the following TCI state $ID_{i,2}$ are to be dropped;

considering Variant C, it can be defined, if "R"=0, to indicate no drop; if "R"=1, to indicate that all QCL parameters except "average delay" referenced in the TCI state identified by the following TCI state $ID_{i,2}$ are to be dropped.

Additionally, if TCI State #1 references a QCL assumption of the type QCL-TypeC:

considering Variant C, it can be defined, if "R"=0, to indicate no drop; if "R"=1, to indicate that the "Doppler shift" parameter referenced in the TCI state identified by the following TCI state $ID_{i,2}$ is to be dropped.

The manner in which the dropping rule is applied may depend on specific implementations on the UE side. In one example, the UE may find and exclude one or more unintended QCL parameters (e.g., parameters corresponding to bits of '1' in the bitmap) according to the dropping rule and establish a QCL relation with respect to the remaining parameters. In another example, the UE may find one or more intended QCL parameters (e.g., parameters corresponding to bits of '0' in the bitmap) according to the dropping rule and establish a QCL relation with respect to this/these parameters. That is, the dropping on the UE side includes not only direct disablement but also indirect enablement.

The embodiments of the present disclosure may also consider whether the UE supports the drop operation on a portion of the QCL parameters in the TCI state. The UE may inform the base station through a capability report. In response to the received report indicating that the UE has the capability to support the dropping operation, the base station may implement the above-described mechanism of "QCL indication+dropping rule", and the UE may receive the dropping rule through a MAC CE or a DCI.

The mechanism according to the present disclosure may not be applicable if the UE does not support any dropping scheme of QCL parameters. The protocol should define entirely new QCL types to indicate that a QCL relation involving only time-domain parameters is established.

For example, considering the above Variant A and Variant B, one can define

"QCL-TypeE": with respect to {average delay, delay spread};

and considering the above Variant C, one can define

"QCL-TypeF": with respect to {average delay}.

The base station may indicate a QCL relation with TRP #1 for the UE using a TCI state of the new type QCL-TypeE or QCL-TypeF.

Although examples of conveying the dropping rule through dynamic signaling such as MAC CE or DCI are described above, the present disclosure is not limited thereto. According to embodiments of the present disclosure, the dropping rule may also be configured to the UE in the form of a RRC parameter. When the UE receives multiple TCI states indicated for multiple TRPs simultaneously, it may automatically apply a pre-configured dropping rule to a respective TCI state, thereby dropping the unintended QCL parameters to which it applies. For example, in the scenario discussed above with reference to TRP #0 and TRP #1, the base station may pre-configure the UE with a dropping rule for TCI state #1 so that the UE may drop the frequency-domain QCL parameters according to the dropping rule. The base station may also pre-configure the UE with a dropping rule for TCI state #0 so that the UE may drop the time-domain QCL parameters according to the dropping rule. This manner may avoid the overhead brought by dynamic signaling.

It should be noted that the transmission of the RRC parameter, MAC CE, DCI as described above may be performed by any one of the TRPs of the base station, depending on scheduling by the base station. In other words, TRP #0 and TRP #1 do not have a particular order in terms of the signaling transmission.

For the UE, the result of its dropping operation will result in establishment of a QCL relation with respect to a portion of the QCL parameters referenced in the TCI state (the QCL parameters that are not dropped). For example, by applying the dropping rule to TCI state #1, the UE will establish a QCL relation between TRS #1 referenced in TCI state #1 and PDSCH/PDCCH/DMRS with respect to the time-domain QCL parameters, so that the time-domain parameters for receiving TRS #1 can be used for reception of upcoming PDSCH or monitoring of PDCCH. On the other hand, the UE may establish a QCL relation between TRS #0 referenced in TCI state #0 and PDSCH/PDCCH/DMRS with respect to all QCL parameters or only frequency-domain QCL parameters.

Figure 14:
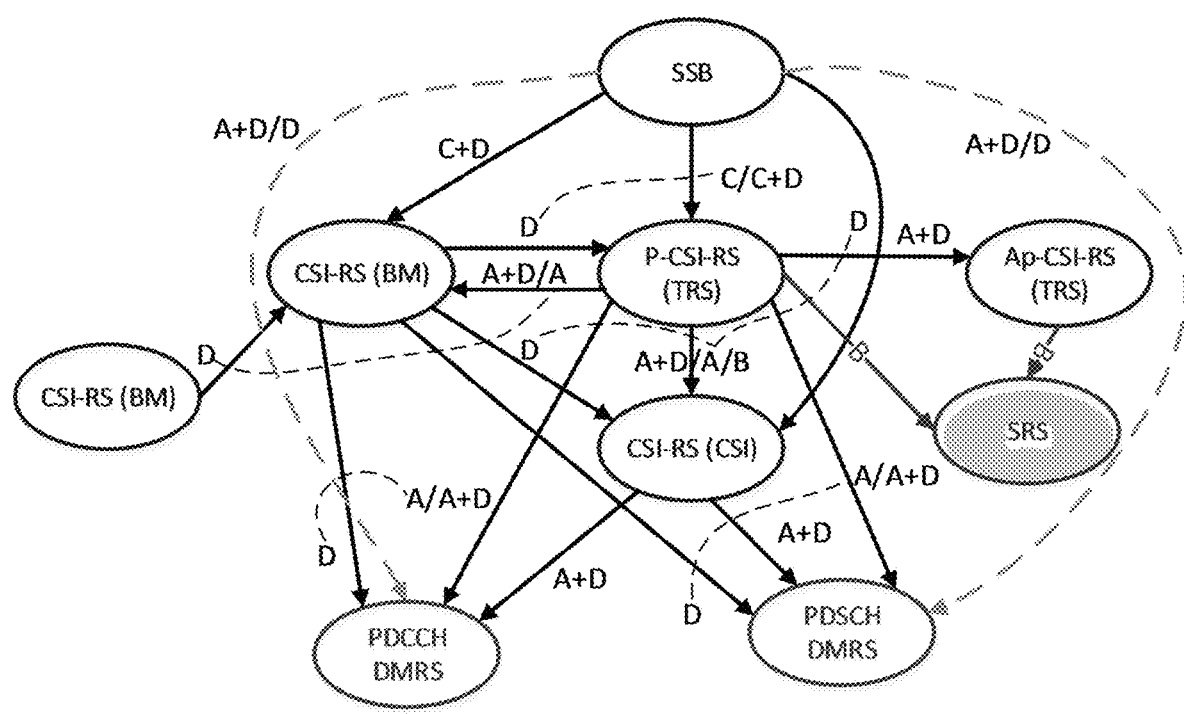
FIG. 14 illustrates an improved QCL relation map.

According to embodiments of the present disclosure, it may be contemplated to establish a QCL relation between a TRS and another reference signal instead of PDSCH/PDCCH/DMRS. In the QCL relation map of Release 15/16, we can see that all of the QCL relations are between downlink reference signals. However, as mentioned in the Doppler shift pre-compensation process described with reference to FIG. 10, the UE needs to transmit SRSs to TRP #0 and TRP #1, respectively. Accordingly, it may be contemplated to establish a relation between the TRP-specific TRS and the TRP-specific SRS, as shown in FIG. 14, and a relation of the type QCL-TypeB (optionally, also QCL-TypeD) between the TRS (e.g., a periodic CSI-RS or an aperiodic CSI-RS) and the SRS is newly defined. The new QCL relation indicates that the UE should transmit subsequent SRS resources at the frequency point (the carrier frequency point after Doppler shift) where the TRS is received, and transmit the SRS using an uplink transmission beam corresponding to the reception beam for the TRS.

For transmissions of the TRS and the SRS, it may be considered that an aperiodic TRS and an aperiodic SRS are triggered simultaneously by using an uplink scheduling DCI (e.g., DCI format 0_1/0_2), and the SRS and the TRS satisfy the new QCL relation.

For a downlink scheduling DCI (e.g., DCI format 1_1/1_2), there is no field for triggering an aperiodic TRS but there is a field for triggering an aperiodic SRS. Here, it may be contemplated that the aperiodic SRS is configured with a resource of an associated aperiodic TRS, and once the SRS is triggered, then the TRS is also triggered, but with a condition of triggering the TRS in a time period before the SRS is triggered, so that the UE has enough time to complete tracking and estimation of the TRS, so as to transmit the subsequent SRS.

Although the embodiments of the present disclosure are described above mainly in the context of SFN utilizing the Doppler shift pre-compensation technique, it should be noted that the application scope of the QCL indication mechanism based on the dropping rule of the present disclosure is not limited thereto.

For example, there may also be situations where there is no suitable TCI state for implementing the QCL indication. In Release 15/16, the communication network configures the UE with at most 64 TCI states and activates at most 8 TCI states, but when, for example, a drastic change in the communication environment occurs, it may happen that none of these TCI states are suitable for the QCL indication. It takes a significant amount of resources to reconfigure appropriate TCI states for the UE. At this point, the QCL indication method according to the present disclosure can be used, and a TCI state plus a dropping rule can essentially provide a QCL assumption that contains a subset of the QCL parameters referenced in the TCI state. Thus, in the case of scarce TCI state resources, the TCI state pool configured by the base station for the UE may contain only TCI states of the type QCL-TypeA (QCL-TypeD is not considered in the present disclosure), and if QCL-TypeB, QCL-TypeC, or any other type with less than four QCL parameters needs to be indicated, it may be implemented by a TCI state of the type QCL-TypeA and a corresponding dropping rule. Thereby, the applicability of the QCL indication is significantly improved.

Various aspects of the embodiments of the present disclosure have been described in detail above, but it will be appreciated that the structure, arrangement, type, number and the like of antenna arrays, ports, reference signals, communication devices, communication methods and the like are illustrated for purpose of description, and are not intended to limit the aspects of the present disclosure to these specific examples.

It should be understood that the various units of the electronic device 100 and 200 described in the above embodiments are only logical modules divided according to specific functions they implement, and are not used to limit specific implementations. In an actual implementation, the foregoing units may be implemented as individual physical entities, or may also be implemented by a single entity (for example, a processor (CPU or DSP, etc.), an integrated circuit, etc.).

EXEMPLARY IMPLEMENTATIONS OF THE PRESENT DISCLOSURE

According to the embodiments of the present disclosure, various implementations for practicing concepts of the present disclosure can be conceived, including but not limited to the following exemplary examples (EEs):

EE1. An electronic device on side of a user equipment (UE), comprising:

a processing circuitry configured to receive, from a base station, a quasi co-location (QCL) indication regarding a QCL assumption between a first antenna port and a second antenna port, the QCL indication referencing a plurality of QCL parameters;

according to a dropping rule associated with the QCL indication, drop a portion of the plurality of QCL parameters; and establish a QCL relation between the first antenna port and the second antenna port with respect to remaining QCL parameters referenced in the QCL indication.

EE2. The electronic device of EE1, wherein the processing circuitry is further configured to receive the dropping rule in a downlink control information (DCI) or a medium access control (MAC) control element (CE) for receiving the QCL indication.

EE3. The electronic device of EE1, wherein the dropping rule is pre-configured to the UE by the base station via a RRC parameter.

EE4. The electronic device of EE1, wherein the dropping rule is represented as
- a bitmap in which each bit indicates whether at least one corresponding QCL parameter is to be dropped or not; or
- a codepoint value which indicates one of a predefined group of QCL parameter dropping schemes.

EE5. The electronic device of EE1, wherein the dropping comprises identifying the remaining QCL parameters from the plurality of QCL parameters based on the dropping rule.

EE6. The electronic device of any of EE1-EE5, wherein the processing circuitry is further configured to
- report, to the base station, that the UE has capability to support the dropping operation on the QCL parameters; and receive the dropping rule from the base station.

EE7. The electronic device of EE1, wherein the QCL indication is associated with a first transmit receive point (TRP), wherein the first TRP performs Doppler shift pre-compensation on signals transmitted to the UE such that a frequency point at which the UE receives signals from the first TRP becomes substantially coinciding with a frequency point at which the UE receives signals from a second TRP, the first TRP and the second TRP operating in a single frequency network (SFN) mode,
- wherein the processing circuitry is configured to drop frequency-domain QCL parameters referenced in the QCL indication according to the dropping rule.

EE8. The electronic device of EE7, wherein the processing circuitry is further configured to
- receive, from the base station, an RRC parameter indicating enablement of the Doppler shift pre-compensation.

EE9. The electronic device of EE7, wherein the processing circuitry is further configured to
- receive, from the base station, a MAC CE including a QCL indication associated with the first TRP and a QCL indication associated with the second TRP.

EE10. The electronic device of EE9, wherein the processing circuitry is further configured to
- drop time-domain QCL parameters referenced in the QCL indication associated with the second TRP.

EE11. The electronic device of EE7, wherein the first antenna port is for transmitting Tracking Reference Signal (TRS), and the second antenna port is for transmitting Physical Downlink Control Channel (PDCCH) or Physical Downlink Shared Channel (PDSCH).

EE12. The electronic device of EE11, wherein the processing circuitry is further configured to
- based on the QCL indication, establish a QCL relation between the first antenna port and an antenna port for transmitting Sounding Reference Signal (SRS) with respect to frequency-domain QCL parameters, such that the UE can transmit the SRS on a frequency point at which the TRS is received.

EE13. The electronic device of EE11, wherein the processing circuitry is further configured to
- based on the QCL indication, establish a QCL relation between the first antenna port and an antenna port for transmitting Sounding Reference Signal (SRS) with respect to spatial-domain QCL parameters, such that a beam for receiving the TRS is to be used by the UE to transmit the SRS.

EE14. The electronic device of EE12, wherein the processing circuitry is further configured to simultaneously trigger transmissions of the TRS and the SRS by receiving a DCI.

EE15. An electronic device on side of a base station, comprising:
- a processing circuitry configured to
  - generate a quasi co-location (QCL) indication regarding a QCL assumption between a first antenna port and a second antenna port, the QCL indication referencing a plurality of QCL parameters;
  - determine a dropping rule associated with the QCL indication, the dropping rule indicating a portion of the plurality of QCL parameters to be dropped; and
  - send the QCL indication and the dropping rule to a UE.

EE16. The electronic device of EE15, wherein the processing circuitry is further configured to
- send the QCL indication and the dropping rule to the UE in a downlink control information (DCI) or a medium access control (MAC) control element (CE), or
- pre-configure the dropping rule to the UE via a RRC parameter.

EE17. The electronic device of EE15, wherein the processing circuitry is further configured to
- receive, from the UE, a report that the UE has capability to support a dropping operation on the QCL parameters; and
- in response to the report, send the dropping rule to the UE.

EE18. The electronic device of EE15, wherein the QCL indication is associated with a first transmit receive point (TRP), wherein the first TRP performs Doppler shift pre-compensation on signals transmitted to the UE such that a frequency point at which the UE receives signals from the first TRP becomes substantially coinciding with a frequency point at which the UE receives signals from a second TRP, the first TRP and the second TRP operating in a single frequency network (SFN) mode,
- wherein the dropping rule indicates frequency-domain QCL parameters referenced in the QCL indication to be dropped.

EE19. The electronic device of EE18, wherein the processing circuitry is further configured to pre-configure enablement of the Doppler shift pre-compensation to the UE, and send a MAC CE including a QCL indication associated with the first TRP and a QCL indication associated with the second TRP.

EE20. The electronic device of EE15, wherein the processing circuitry is further configured to simultaneously trigger transmissions of a TRS and an SRS by sending a DCI.

EE21. A communication method, comprising:
- receiving, from a base station, a quasi co-location (QCL) indication regarding a QCL assumption between a first antenna port and a second antenna port, the QCL indication referencing a plurality of QCL parameters;
- according to a dropping rule associated with the QCL indication, dropping a portion of the plurality of QCL parameters; and
- establishing a QCL relation between the first antenna port and the second antenna port with respect to remaining QCL parameters referenced in the QCL indication.

EE22. A communication method, comprising:
- generating a quasi co-location (QCL) indication regarding a QCL assumption between a first antenna port and a second antenna port, the QCL indication referencing a plurality of QCL parameters;
- determining a dropping rule associated with the QCL indication, the dropping rule indicating a portion of the plurality of QCL parameters to be dropped; and
- sending the QCL indication and the dropping rule to a UE.

EE23. A computer program product comprising executable instructions which, when executed, perform the communication method according to claim 21 or 22.

APPLICATION EXAMPLES OF THE PRESENT DISCLOSURE

The technology described in the present disclosure can be applied to various products.

For example, the electronic device 200 according to the embodiments of the present disclosure can be implemented as or installed in a variety of base stations, and the electronic device 100 can be implemented as or installed in a variety of user devices.

The communication method according to the embodiments of the present disclosure may be implemented by various base stations or user devices; the methods and operations according to the embodiments of the present disclosure may be embodied as computer-executable instructions, stored in a non-transitory computer-readable storage medium, and can be performed by various base stations or user devices to implement one or more of the above-mentioned functions.

The technology according to the embodiments of the present disclosure can be made into various computer program products, which can be used in various base stations or user devices to implement one or more of the above-mentioned functions.

It should be noted that the term "base station" used in the present disclosure is not limited to the above two types of nodes, but serves as an example of a control device on the network side, and has the full breadth of its usual meaning. The base stations mentioned in the present disclosure can be implemented as any type of base stations, preferably, such as the macro gNB or ng-eNB defined in the 3GPP 5G NR standard. A gNB may be a gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wireless relay, a drone control tower, a control unit in an automated factory or the like disposed in a different place from the main body.

In addition, in the present disclosure, the term "UE" has the full breadth of its usual meaning, including various terminal devices or in-vehicle devices that communicate with the base station. The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (that is also referred to as a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Application examples of the base station and the UE in which the present disclosure can be applied will be described briefly below.

First Application Example of the Base Station

Figure 15:
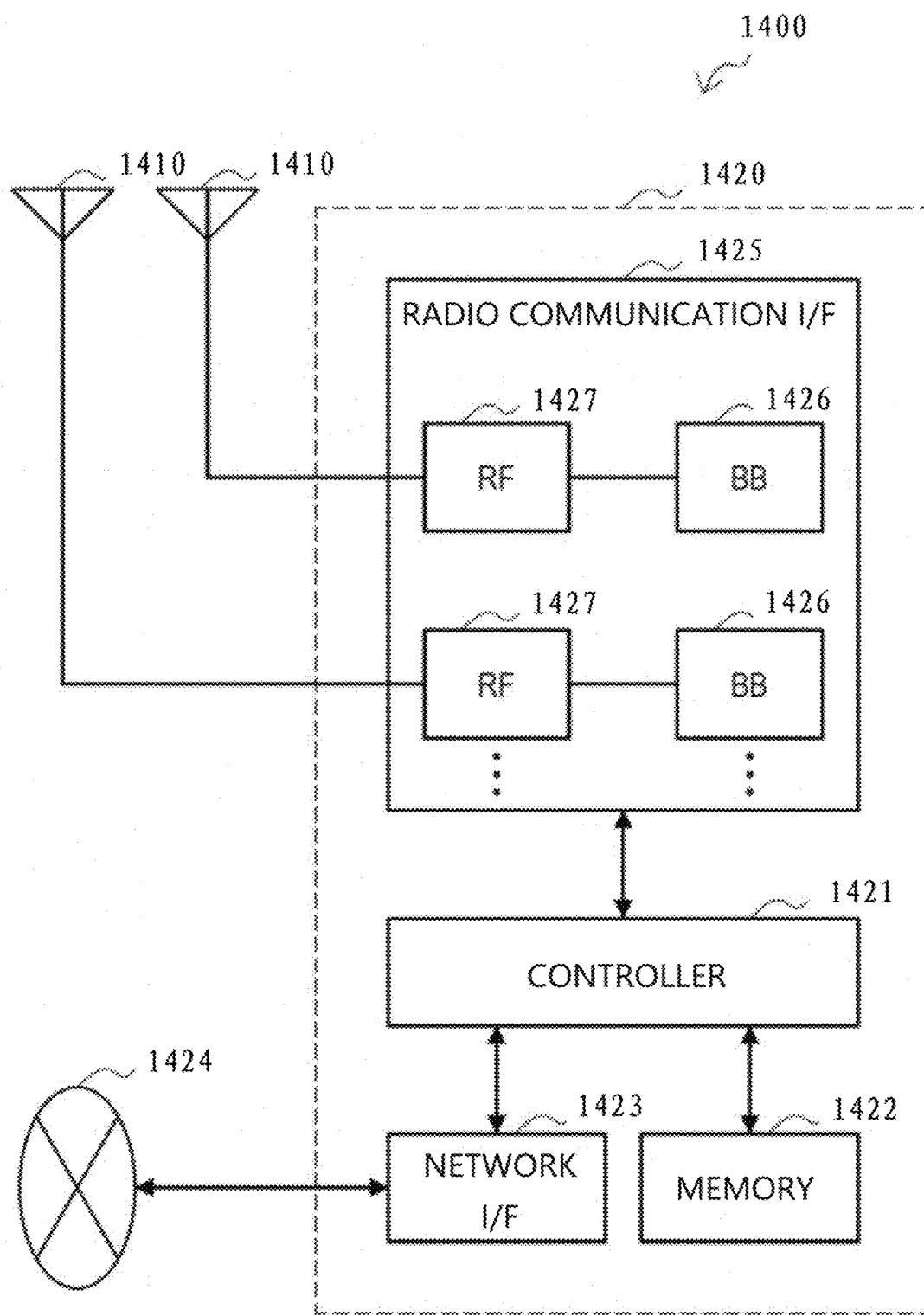
FIG. 15 illustrates a first example of schematic configuration of the base station according to the present disclosure.

FIG. 15 is a block diagram showing a first example of a schematic configuration of a base station to which the technology of the present disclosure can be applied. In FIG. 15, the base station is implemented as gNB 1400. The gNB 1400 includes a plurality of antennas 1410 and a base station device 1420. The base station device 1420 and each antenna 1410 may be connected to each other via an RF cable. In an implementation, the gNB 1400 (or the base station device 1420) herein may correspond to the above-mentioned electronic device 200.

The antennas 1410 includes multiple antenna elements, such as multiple antenna arrays for massive MIMO. The antennas 1410, for example, can be arranged into a matrix of antenna arrays, and are used by the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a radio communication interface 1425.

The controller 1421 may be, for example, a CPU or a DSP, and operates various functions of the base station device 1420 at a higher layer. For example, the controller 1421 may include the processing circuitry 201 as described above, perform the communication method described in FIG. 4B, or control various components of the electronic device 200. For example, the controller 1421 generates data packets based on data in signals processed by the radio communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an SI interface and an X2 interface. The network interface 1423 may also be a wired communication interface or a radio communication interface for a wireless backhaul line. If the network interface 1423 is a radio communication interface, compared with the frequency band used by the radio communication interface 1425, the network interface 1423 can use a higher frequency band for wireless communication.

The radio communication interface 1425 supports any cellular communication scheme such as 5G NR, and provides a wireless connection to a terminal located in a cell of the gNB 1400 via an antenna 1410. The radio communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as the physical layer, the MAC layer, the RLC layer, and the PDCP layer. As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 15 illustrates an example in which one RF circuit 1427 is connected to one antenna 1410, the present disclosure is not limited to this illustration, but one RF circuit 1427 may be connected to multiple antennas 1410 at the same time.

As shown in FIG. 15, the radio communication interface 1425 may include a plurality of BB processors 1426. For example, the plurality of BB processors 1426 may be compatible with multiple frequency bands used by gNB 1400. As shown in FIG. 15, the radio communication interface 1425 may include a plurality of RF circuits 1427. For example, the plurality of RF circuits 1427 may be compatible with multiple antenna elements. Although FIG. 15 shows an example in which the radio communication interface 1425 includes a plurality of BB processors 1426 and a plurality of RF circuits 1427, the radio communication interface 1425 may also include a single BB processor 1426 or a single RF circuit 1427.

In the gNB 1400 illustrated in FIG. 15, one or more of the units included in the processing circuitry 201 described with reference to FIG. 4A may be implemented in the radio communication interface 1425. Alternatively, at least a part of these components may be implemented in the controller 1421. As an example, the gNB 1400 includes a part (for example, the BB processor 1426) or the entirety of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 16:
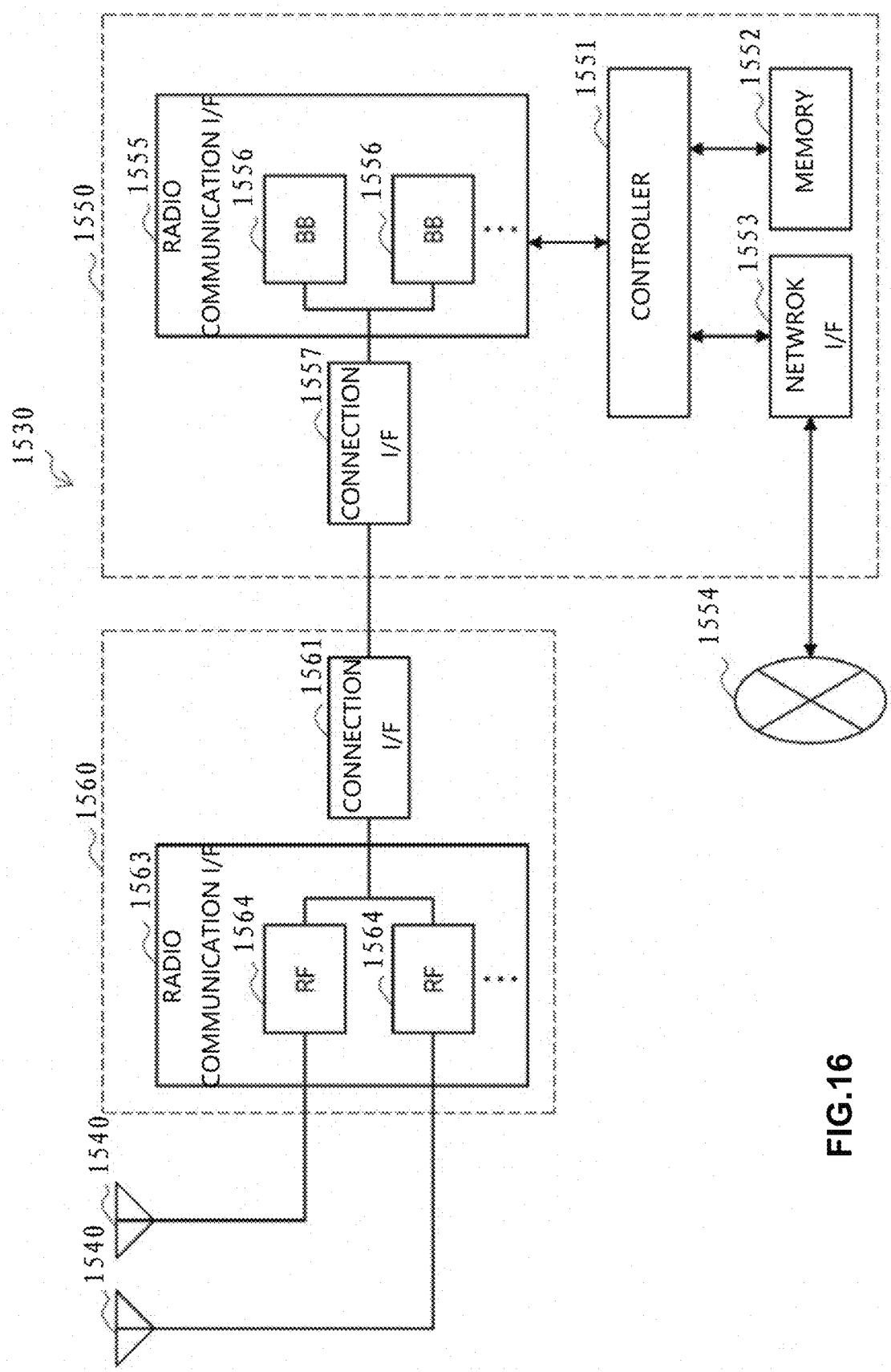
FIG. 16 illustrates a second example of schematic configuration of the base station according to the present disclosure.

FIG. 16 is a block diagram showing a second example of a schematic configuration of a base station to which the technology of the present disclosure can be applied. In FIG. 16, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic device 200.

The antennas 1540 includes multiple antenna elements, such as multiple antenna arrays for massive MIMO. The antennas 1540, for example, can be arranged into a matrix of antenna arrays, and are used by the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 15.

The radio communication interface 1555 supports any cellular communication scheme such as 5G NR, and provides wireless communication to a terminal located in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 15 except that the BB processor 1556 is connected to the RF circuit 1564 of the RRH 1560 via the connection interface 1557. As shown in FIG. 16, the radio communication interface 1555 may include a plurality of BB processors 1556. For example, multiple BB processors 1556 may be compatible with multiple frequency bands used by gNB 1530. Although FIG. 16 shows an example in which the radio communication interface 1555 includes a plurality of BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-mentioned high-speed line connecting the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-mentioned high-speed line.

The radio communication interface 1563 transmits and receives wireless signals via the antenna 1540. The radio communication interface 1563 may generally include, for example, an RF circuit 1564. The RF circuit 1564 may include, for example, a mixer, a filter, and an amplifier, and transmits and receives wireless signals via the antenna 1540. Although FIG. 16 illustrates an example in which one RF circuit 1564 is connected to one antenna 1540, the present disclosure is not limited to this illustration, but one RF circuit 1564 may be connected to multiple antennas 1540 at the same time.

As shown in FIG. 16, the radio communication interface 1563 may include a plurality of RF circuits 1564. For example, the plurality of RF circuits 1564 may support multiple antenna elements. Although FIG. 16 shows an example in which the radio communication interface 1563 includes a plurality of RF circuits 1564, the radio communication interface 1563 may include a single RF circuit 1564.

In the gNB 1500 shown in FIG. 16, one or more of the units included in the processing circuitry 201 described with reference to FIG. 4A may be implemented in the radio communication interface 1525. Alternatively, at least a part of these components may be implemented in the controller 1521. For example, the gNB 1500 includes a part (for example, the BB processor 1526) or the whole of the radio communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the radio communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of the User Device

Figure 17:
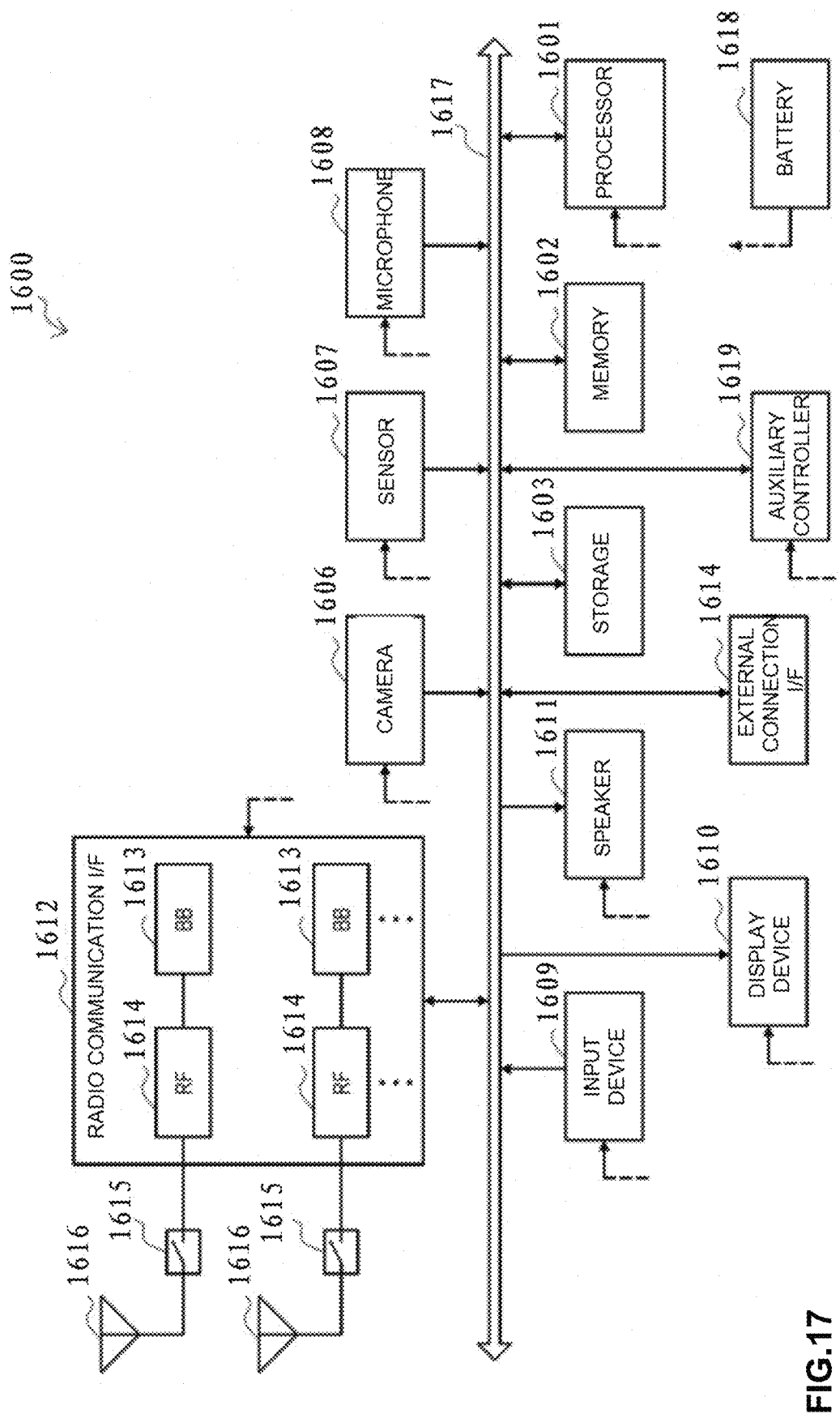
FIG. 17 illustrates an example of schematic configuration of a smart phone according to the present disclosure.

FIG. 17 is a block diagram showing an example of a schematic configuration of a smartphone 1600 to which the technology of the present disclosure can be applied. In an example, the smart phone 1600 may be implemented as the electronic device 100 described with reference to FIG. 3A.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as the processing circuitry 101 described with reference to FIG. 3A. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The radio communication interface 1612 supports any cellular communication scheme such as 4G LTE, 5G NR or the like, and performs wireless communication. The radio communication interface 1612 may generally include, for example, a BB processor 1613 and an RF circuit 1614. The BB processor 1613 may perform, for example, encoding/ decoding, modulation/demodulation, and multiplexing/de-multiplexing, and perform various types of signal processing for wireless communication. Meanwhile, the RF circuit 1614 may include, for example, a mixer, a filter, and an amplifier, and transmits and receives wireless signals via the antenna 1616. The radio communication interface 1612 may be a chip module on which a BB processor 1613 and an RF circuit 1614 are integrated. As shown in FIG. 17, the radio communication interface 1612 may include multiple BB processors 1613 and multiple RF circuits 1614. Although FIG. 17 illustrates an example in which the radio communication interface 1612 includes a plurality of BB processors 1613 and a plurality of RF circuits 1614, the radio communication interface 1612 may also include a single BB processor 1613 or a single RF circuit 1614.

In addition, in addition to the cellular communication scheme, the radio communication interface 1612 may support other types of wireless communication scheme, such as a short-range wireless communication scheme, a near field communication scheme, and a wireless local area network (LAN) scheme. In this case, the radio communication interface 1612 may include a BB processor 1613 and an RF circuit 1614 for each wireless communication scheme.

Each of the antenna switches 1615 switches a connection destination of the antenna 1616 between a plurality of circuits included in the radio communication interface 1612 (for example, circuits for different wireless communication schemes).

The antennas 1616 includes multiple antenna elements, such as multiple antenna arrays for large-scale MIMO. The antennas 1616, for example, can be arranged into a matrix of antenna arrays, and are used by the radio communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619 to each other. The battery 1618 supplies power to each block of the smartphone 1600 shown in FIG. 17 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 17, one or more of the components included in the processing circuitry 101 described with reference to FIG. 3A may be implemented in the radio communication interface 1612. Alternatively, at least a part of these components may be implemented in the processor 1601 or the auxiliary controller 1619. As an example, the smart phone 1600 includes a part (for example, the BB processor 1613) or the whole of the radio communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the radio communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of the User Device

Figure 18:
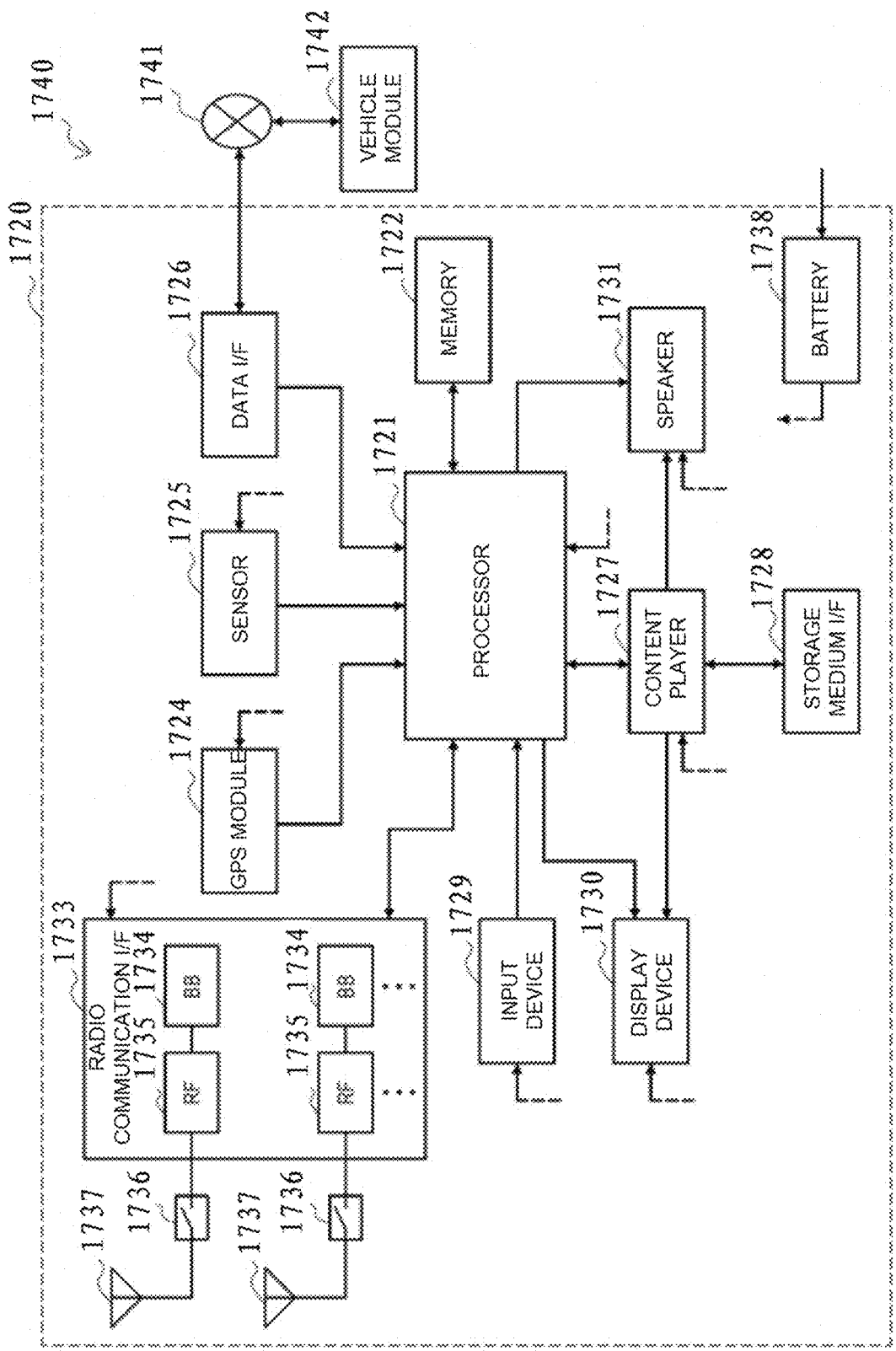
FIG. 18 illustrates an example of schematic configuration of an automobile navigation device according to the present disclosure.

FIG. 18 is a block diagram showing an example of a schematic configuration of a car navigation device 1720 to which the technology of the present disclosure can be applied. The car navigation device 1720 may be implemented as the electronic device 100 described with reference to FIG. 3A. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The radio communication interface 1733 supports any cellular communication scheme such as the 4G LTE or the 5G NR, and performs wireless communication. The radio communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The radio communication interface 1733 may also be a chip module on which a BB processor 1734 and an RF circuit 1735 are integrated. As shown in FIG. 18, the radio communication interface 1733 may include a plurality of BB processors 1734 and a plurality of RF circuits 1735. Although FIG. 18 shows an example in which the radio communication interface 1733 includes a plurality of BB processors 1734 and a plurality of RF circuits 1735, the radio communication interface 1733 may also include a single BB processor 1734 or a single RF circuit 1735.

In addition, in addition to the cellular communication scheme, the radio communication interface 1733 may support other types of wireless communication scheme, such as a short-range wireless communication scheme, a near field communication scheme, and a wireless LAN scheme. In this case, the radio communication interface 1733 may include a BB processor 1734 and an RF circuit 1735 for each wireless communication scheme.

Each of the antenna switches 1736 switches the connection destination of the antenna 1737 between a plurality of circuits included in the radio communication interface 1733, such as circuits for different wireless communication schemes.

The antennas 1737 includes multiple antenna elements, such as multiple antenna arrays for massive MIMO. The antennas 1737, for example, can be arranged into a matrix of antenna arrays, and are used by the radio communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 18 via a feeder, and the feeder is partially shown as a dotted line in the figure. The battery 1738 accumulates power provided from the vehicle.

In the car navigation device 1720 shown in FIG. 18, one or more of the components included in the processing circuitry 101 described with reference to FIG. 3A can be implemented in the radio communication interface 1733. Alternatively, at least a part of these components may be implemented in the processor 1721. As an example, the car navigation device 1720 includes a part (for example, the BB processor 1734) or the whole of the radio communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the radio communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

In addition, in the car navigation device 1720 shown in FIG. 18, the communication 105 in FIG. 3A can be implemented in the radio wireless interface 1733 (e.g., the RF circuit 1735).

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device on side of a user equipment (UE), comprising:
   a processing circuitry configured to
   receive, from a base station, a quasi co-location (QCL) indication regarding a QCL assumption between a first antenna port and a second antenna port, the QCL indication referencing a plurality of QCL parameters;
   according to a predetermined criteria associated with the QCL indication, drop a portion of the plurality of QCL parameters; and
   establish a QCL relation between the first antenna port and the second antenna port with respect to remaining QCL parameters referenced in the QCL indication,
   wherein the QCL indication is associated with a first transmit receive point (TRP),
   wherein the first TRP performs Doppler shift pre-compensation on signals transmitted to the UE such that a frequency point at which the UE receives signals from the first TRP becomes substantially coinciding with a frequency point at which the UE receives signals from a second TRP, the first TRP and the second TRP operating in a single frequency network (SFN) mode, and
   wherein the processing circuitry is configured to drop frequency-domain QCL parameters referenced in the QCL indication according to the predetermined criteria.

2. The electronic device of claim 1, wherein the processing circuitry is further configured to receive the predetermined criteria in a downlink control information (DCI) or a medium access control (MAC) control element (CE) for receiving the QCL indication.

3. The electronic device of claim 1, wherein the predetermined criteria is pre-configured to the UE by the base station via a radio resource control (RRC) parameter.

4. The electronic device of claim 1, wherein the predetermined criteria is represented as:
   a bitmap in which each bit indicates whether at least one corresponding QCL parameter is to be dropped or not; or
   a codepoint value which indicates one of a predefined group of QCL parameter dropping schemes.

5. The electronic device of claim 1, wherein the portion of the plurality of QCL parameters is dropped based on identifying the remaining QCL parameters from the plurality of QCL parameters based on the predetermined criteria.

6. The electronic device of claim 1, wherein the processing circuitry is further configured to;
   report, to the base station, that the UE has capability to drop the portion of the plurality of QCL parameters; and
   receive the predetermined criteria from the base station.

7. The electronic device of claim 1, wherein the processing circuitry is further configured to receive, from the base station, an RRC parameter indicating enablement of the Doppler shift pre-compensation.

8. The electronic device of claim 1, wherein the processing circuitry is further configured to receive, from the base station, a MAC CE including a QCL indication associated with the first TRP and a QCL indication associated with the second TRP.

9. The electronic device of claim 8, wherein the processing circuitry is further configured to drop time-domain QCL parameters referenced in the QCL indication associated with the second TRP.

10. The electronic device of claim 1, wherein the first antenna port is for transmitting a Tracking Reference Signal (TRS), and the second antenna port is for transmitting a Physical Downlink Control Channel (PDCCH) or a Physical Downlink Shared Channel (PDSCH).

11. The electronic device of claim 10, wherein the processing circuitry is further configured to, based on the QCL indication, establish a QCL relation between the first antenna port and an antenna port for transmitting a Sounding Reference Signal (SRS) with respect to spatial-domain QCL parameters, such that a beam for receiving the TRS is to be used by the UE to transmit the SRS.

12. The electronic device of claim 10, wherein the processing circuitry is further configured to, based on the QCL indication, establish a QCL relation between the first antenna port and an antenna port for transmitting a Sounding Reference Signal (SRS) with respect to frequency-domain QCL parameters.

13. The electronic device of claim 12, wherein the processing circuitry is further configured to simultaneously trigger transmissions of the TRS and the SRS by receiving a Downlink Control Information (DCD).

14. An electronic device on side of a base station, comprising:
    a processing circuitry configured to
    generate a quasi co-location (QCL) indication regarding a QCL assumption between a first antenna port and a second antenna port, the QCL indication referencing a plurality of QCL parameters;

determine a predetermined criteria associated with the QCL indication, the predetermined criteria indicating a portion of the plurality of QCL parameters to be dropped; and send the QCL indication and the predetermined criteria to a UE, wherein the QCL indication is associated with a first transmit receive point (TRP), wherein the first TRP performs Doppler shift pre-compensation on signals transmitted to the UE such that a frequency point at which the UE receives signals from the first TRP becomes substantially coinciding with a frequency point at which the UE receives signals from a second TRP, the first TRP and the second TRP operating in a single frequency network (SFN) mode, and wherein the predetermined criteria indicates frequency-domain QCL parameters referenced in the QCL indication to be dropped.

15. The electronic device of claim 14, wherein the processing circuitry is further configured to send the QCL indication and the predetermined criteria to the UE in a downlink control information (DCI) or a medium access control (MAC) control element (CE), or pre-configure the predetermined criteria to the UE via a radio resource control (RRC) parameter.

16. The electronic device of claim 14, wherein the processing circuitry is further configured to receive, from the UE, a report that the UE has capability to drop the portion of the plurality of QCL parameters; and in response to the report, send the predetermined criteria to the UE.

17. The electronic device of claim 14, wherein the processing circuitry is further configured to pre-configure enablement of the Doppler shift pre-compensation to the UE, and send a MAC CE including a QCL indication associated with the first TRP and a QCL indication associated with the second TRP.

18. The electronic device of claim 14, wherein the processing circuitry is further configured to simultaneously trigger transmissions of a Tracking Reference Signal (TRS) and Sounding Reference Signal (SRS) by sending a Downlink Control Information (DCI).

* * * * *